United States Patent
Ruan et al.

(10) Patent No.: US 8,321,053 B2
(45) Date of Patent: Nov. 27, 2012

(54) FLEXIBLE TWO-WHEELED SELF-BALANCING ROBOT SYSTEM AND ITS MOTION CONTROL METHOD

(75) Inventors: Xiaogang Ruan, Beijing (CN); Xinyuan Li, Beijing (CN); Honggui Han, Beijing (CN); Jianwei Zhao, Beijing (CN); Naigong Yu, Beijing (CN); Hongge Ren, Beijing (CN); Jianxian Cai, Beijing (CN)

(73) Assignee: Beijing University of Technology, Beijing (CN)

( * ) Notice: Subject to any disclaimer, the term of this patent is extended or adjusted under 35 U.S.C. 154(b) by 303 days.

(21) Appl. No.: 12/770,328

(22) Filed: Apr. 29, 2010

(65) Prior Publication Data

US 2010/0292840 A1    Nov. 18, 2010

(30) Foreign Application Priority Data

May 15, 2009   (CN) .......................... 2009 1 0084259

(51) Int. Cl.
   *B25J 5/00* (2006.01)
   *G05B 15/02* (2006.01)
(52) U.S. Cl. .................. 700/245; 700/259; 318/568.12
(58) Field of Classification Search .................. 700/245, 700/258, 259; 701/124; 180/6.48, 6.5, 65.1, 180/218; 901/1; 318/568.11, 568.12
   See application file for complete search history.

(56) References Cited

U.S. PATENT DOCUMENTS

| 5,350,033 | A  * | 9/1994  | Kraft ............................. 180/167 |
| 7,649,331 | B2 * | 1/2010  | Hosoda et al. ........... 318/568.12 |
| 7,677,345 | B2 * | 3/2010  | Hosoda ........................ 180/218 |
| 7,747,349 | B2 * | 6/2010  | Yeh et al. ...................... 700/245 |
| 7,789,175 | B2 * | 9/2010  | Tobey et al. ................. 180/65.1 |
| 7,823,676 | B2 * | 11/2010 | Yamada et al. ............... 180/218 |
| 2004/0162636 | A1* | 8/2004  | Hattori et al. ................. 700/245 |

FOREIGN PATENT DOCUMENTS

| CN | 200510094939.X | 10/2005 |
| CN | 200720103279.1 | 1/2007 |

* cited by examiner

*Primary Examiner* — Joseph Rocca
(74) *Attorney, Agent, or Firm* — J.C. Patents

(57) ABSTRACT

A flexible two-wheeled self-balancing robot system and its motion control method include a main controller 1, a motion controller 2, an assistant controller 3, two servo drivers 4, sensors, input/output devices, two DC motors 5 and a power supply system; a camera is installed on truck's top board 11, a tilt-meter and a gyro are installed both in truck 6 and chassis 8. Truck 6 and chassis 8 are connected with an elastic joint in which is installed a two-arm torsion spring and a cylindrical spring; the main controller 1 is connected to the motion controller 2, the assistant controller 3 and input/output devices. The user commands received by the main controller 1 are immediate commands or stored commands; through main controller 1 running the motion behavior decision algorithm, the motion controller 2 running the motion balancing control algorithm, and the servo drives 4 controlling the torques of the motors 5, locomotion on plane and remote control of the robot can be implemented.

4 Claims, 15 Drawing Sheets

FLEXIBLE TWO-WHEELED SELF-BALANCING ROBOT SYSTEM AND ITS MOTION CONTROL METHOD

CROSS REFERENCE TO RELATED APPLICATION

This application claims the benefit of prior Chinese application No. 200910084259.8 filed on May 15, 2009, the content of which is herein incorporated by reference in its entirety.

BACKGROUND OF THE INVENTION

1. Technical Field

The present invention relates to a two-wheeled mobile robot system and its motion control method which can provide an experimental research platform for control theory courses and robot design courses in engineering and polytechnic colleges and universities.

2. Description of Related Art

The two-wheeled self-balancing robot is also known as a "mobile inverted pendulum". Its locomotion mechanism is the two wheels connected on both sides of the body in parallel whose axle centers face each other. This robot has both the problem of discrete time action decision for a mobile robot and the problem of continuous time attitude control for an inverted pendulum. Therefore, it can be an integrated cross research object and an ideal teaching demonstration device in the fields of robotics and control science.

The entire body of the existing two-wheeled self-balancing robot is of rigid construction, such as the robot disclosed in Patent ZL200510094939.X. From the view that the robot is designed by simulating human body, the rigid structure is unable to reflect the human body, especially the flexibility (elasticity) of the waist structure in the back-forth pitching motion. However, a robot that completely imitates the human body and designed by means of artificial muscles and artificial joint soft tissues is difficult to realize, high in cost, complicated to control and difficult to maintain, so it is impractical to take it as the research on balancing control and motion control problem and teaching demonstration device of flexible body robot.

To aim at addressing the abovementioned problems, Patent ZL200720103279.1 designs a flexible two-wheeled upright robot body. The robot introduces a cylindrical spring connection to realize flexible body. This design is simple and easy to realize, but there are still some deficiencies: first, a simple cylindrical spring connection mode enables the flexible segment of the robot to have unlimited freedom, wherein most parts are not controllable, such as the freedom of left-right sway, which has no prominent significance for the research of attitude control two-wheeled upright robot, but brings about more unnecessary troubles; second, with the height of the elastic joint unchanged, the change of diameter in the cylindrical spring material and cycles is limited, directly restricting the value taking scope of rigid value of the elastic joint, thus the robot is deficient on maneuverability and parameters adjusting scope as a teaching demonstration device. In addition, Patent ZL200720103279.1 relates to the mechanical body structure of such robot only, not the electric system as applied to the robot and attitude balancing control method.

SUMMARY OF THE INVENTION

The present invention aims at providing a two-wheeled self-balancing robot system with flexible pitching joints in its body and its motion control method. The robot system, as an open type intelligent robot research & development platform, provides experimental objects for the research and teaching of control science and robotics; its motion control method realizes the basic functions of the robot and provide reference for developing, using the robot by the user.

The present invention is realized by the following technical means:

A flexible two-wheeled self-balancing robot system, comprising electric system and mechanical body; wherein the electric system includes a main controller 1, a motion controller 2, an auxiliary controller 3, two motor servo drivers 4, sensors, input/output devices, two DC motors 5 and a power supply system; the mechanical body includes a truck 6, an elastic joint 7, a chassis 8, a protective frame 9 and two wheels 10;

The truck 6 is a split-level frame, at least one camera 12 is installed on the top board 11, the space between the top board 11 and bottom plate 13 is isolated into several layers by baffle plates 14, a tilt-meter 15, a gyro 16 and ultrasonic sensors 17 are installed in the truck;

The bottom plate 13 of the truck and the chassis 8 are connected by an elastic joint 7;

The chassis 8 is a box structure, the tilt-meter 18, gyro 19 are installed in the chassis, and two DC motors 5 installed inside are respectively fixed on the inner walls of both sides of the chassis 8, one end of each motor's shaft is connected with the shaft of corresponding wheel 10, the other end of each motor's shaft is connected with corresponding encoder 20; a removable protective frame 9 and a truckle 21 are installed at the bottom of the chassis 8; the two wheels 10 are coaxial;

The main controller 1 is an embedded computer system;

The motion controller 2 adopts a Digital Signal Processor (DSP) system;

The auxiliary controller 3 adopts an Micro Controller Unit (MCU) or DSP embedded system;

The sensors include: two tilt-meters 15, 18 detecting the change of pitching inclination angle of the truck 6 and chassis 8 for the robot, two gyros 16, 19 detecting the change of inclination angle speed, two encoders 20 detecting the change of rotating angle of motors 5, a camera 12 detecting the image information, and ultrasonic sensors 17 detecting the obstacle distance;

The top and bottom of the elastic joint 7 are the upper supporting disc 22 and the lower supporting disc 23, its section is in convex shape and the holes in the center of the discs are used to pass through cables; the upper and lower supporting discs are linked by 2-link with rotating shaft 24, wherein a two-arm torsion spring 25 is fixed on each protruding portion of the rotating shaft 24, the upper arm of the torsion spring 25 is fixed on the upper supporting disc 22, the lower arm of the torsion spring is fixed on the lower supporting disc 23; a section of cylindrical spring 26 is firmly held down and fixed between the upper supporting disc 22 and the lower supporting disc 23, its both ends are sleeved outside respective links of the upper, lower supporting discs 22, 23 respectively;

In the electric system, the main controller 1 is connected with the motion controller 2, the auxiliary controller 3 and the input/output devices; the motion controller 2 is connected with the tilt-meters 15, 18, the gyros 16, 19, the encoders 20 and the servo drivers 4; the auxiliary controller 3 is connected with the ultrasonic sensors 17 and remote receiver 27; the camera 12 is connected with the main controller 1; the power supply system is connected with various electric devices for power supply.

The said power supply system consists of: a rechargeable battery 28, a power relay board 29 for voltage conversion and a power monitor board 30 for monitoring the battery voltage.

The said DC motors 5 adopt DC torque motors, DC motors with reducers or DC brushless motors.

The said input/output devices consist of: a keyboard 31, a mouse 32, a remote controller 33, a LCD 34, a monitor 35, a microphone 36 and a speaker 37.

The motion control method for a flexible two-wheeled self-balancing robot system, comprising: the main controller 1 receives user operation commands from input devices; the main controller 1 monitors the feedback information from various sensors; the main controller 1 gives the straight locomotion and yawing speed control commands of the robot calculated by means of the motion behavior decision algorithm according to user operation commands and feedback information from the sensors regularly to the motion controller 2 for implementation; within one motion control cycle, the motion controller 2 reads the feedback signal of the tilt-meters 15, 18 and gyros 16, 19 of the robot truck 6 and chassis 8, then receives a deviation signal of the inclination angle and inclination angle speed by comparing with the value at zero position; the motion controller 2 reads the feedback signal from the encoders 20 of the motors and calculates the straight locomotion and yawing speed of the robot, and then receives the deviation signal by comparing with the control commands given by the main controller; according to the deviation signal, the motion controller 2 calculates the controlled quantity of the motors as per the preset motion balancing control algorithm, and then sends it to the servo drivers 4 for implementation; the servo drivers 4 controls the running of the motors 5, wherein the motors 5 further drive the two wheels 10 to enable the robot to maintain its body balance and move in the designated mode.

The user commands received by the main controller 1 can be immediate commands, such as input by the remote controller, or stored commands;

The main controller 1 obtains the feedback information of the tilt-meters 15, 18, gyros 16, 19 and the encoders 20 indirectly through communication with the motion controller 2, and the feedback information of the ultrasonic sensors 17 and the commands input by the remote controller 33 through communication with the auxiliary controller 3;

The motion behavior decision algorithm of the main controller 1 is as below: the action generator calculates the expected straight locomotion and yawing speed control commands by referring to the user commands or ultrasonic measurement information, the decision device confirms whether to implement the expected control commands according to the attitude balancing conditions of the robot; when in good attitude balancing condition, the expected control commands are the actual control commands; if in poor attitude balancing condition, the actual control commands are zero, namely, the robot shall be firstly adjusted for balancing;

The motion controller 2 collects the output signals of the tilt-meters 15, 18 and gyros 16, 19 for multiple times through module A/D conversion, and forms feedback signals used by calculating a control cycle through signal processing algorithm such as average filtering;

The motion balancing control algorithm of the motion controller 2 is as below: the straight locomotion speed controller $K_1$ calculates the linear speed controlling quantity $u_1$ according to the attitude deviation signal and linear motion speed deviation, and then the yawing speed controller $K_2$ calculates the yawing speed controlling quantity $u_2$ according to the yawing speed deviation, $[u_1\ u_2]^T$ left-multiplies by the coupled matrix D to calculate the motor control torque $[\tau_1\ \tau_2]^T$; the coupled matrix D is second-order constant matrix $$\begin{bmatrix} a & a \\ a & -a \end{bmatrix}.$$

The servo drivers 4 realize the torque control of the motors 5 through the closed loop of motor armature current feedback.

The said stored commands consist of: action sequence list of program storage, action commands and task-based commands.

The said action generator can be designed by means of table for reference, dynamic planning, expert system and other algorithms.

The said decision device can be designed by means of table looking up, fuzzy logic, expert system and other algorithms.

The methods for designing the said linear motion speed controller and yawing speed controller include: closed-loop pole assignment, linear secondary optimal control, robust control, fuzzy control, self adaptive control and other suitable algorithms;

Comparing with the existing technology, the present invention has the following advantages:

Firstly, the present invention, as an intelligent robot, has both the problem of discrete time action decision for a mobile robot and the problem of continuous time attitude control for an inverted pendulum, so it can be an integrated cross research object in the fields of robotics and control science, and can meet the demands for research and teaching in multiple subjects.

Secondly, the present invention, on the basis of remaining the original advantages of the two-wheeled self-balancing robot, has additional application values, being a research, teaching device with high practical values closely contacting real-life engineering problems. In such practical applications such as rocket launching, the problem of the gravity center being above the fulcrum exists, while this object is not limited to the motion on linear or circular orbit. Therefore, the simulation by orbital inverted pendulum on such problem is quite restricted. The two-wheeled self-balancing robot (mobile inverted pendulum) is closer to the real-life control problem. The present invention, by providing a two-wheeled locomotion mechanism, continues the abovementioned advantages of a two-wheeled self-balancing robot. Moreover, in practical application, the waist joints of some human-emulation two-wheeled robots and drivers' waists of two-wheeled electrical bicycle can be taken as the elastic joint which is, abstractly, the structure of the present invention. Therefore, the present invention can be the ideal object for researching this specific system control problems.

Thirdly, the present invention improves on the mechanical structure of the elastic joint so that it becomes more logic and practical in application. First of all, it introduces a single-freedom rotating hinge and defines the control target of the robot elastic joint balancing to pitching freedom so as to ensure the controllability; secondly, with the height of the elastic joint unchanged, the adjusting range of diameter of cylindrical spring material and cycles is limited, directly restricting the value taking scope of rigid value of the elastic joint, while the horizontal installation mode of the torsion spring greatly increases the change space of diameter of spring material and the introduction of symmetrical torsion spring can expand the rigidity adjusting range of the elastic joint, thus the robot has more characteristics as a research object.

Fourthly, the dynamic characteristics of the spring in the elastic joint for the present invention is nonlinear, while the damping, fatigue and joint attrition of the spring material cause the uncertainty of the system parameters, thus increasing the nonlinearity and uncertainty of the system, so is more suitable for the research of nonlinear control, robust control and intelligent control.

Fifthly, the electric system of the present invention adopts a split-level structure so that the controllers at various levels play their respective roles, thus strengthening the processing capacity of the robot and effectively reducing the calculation load in response to complicated control algorithm, which is very suitable for taking this robot as the multi-purpose research platform; furthermore, the split-level structure allows the hardware system to have good expansion capacity.

Sixthly, the electric system of the present invention has both a PC system and an embedded system, and the PC system can be directly used to develop the application software of various embedded systems. In this way, after the user connects the mouse, keyboard, monitor and other I/O devices, the development of the programs of multiple hardware system directly on the robot system not only makes the development become more convenient, but also can realize the software development process of multiple hardware systems so that the robot is suitable for practical teaching procedure of multiple courses.

Seventhly, the motion control method of the present invention can realize the attitude balancing control and motion speed control of the flexible two-wheeled self-balancing robot so as to allow the user to further develop other advanced control functions based on this.

Eighthly, the present invention is equipped with a remote control system and obstacle avoidance system so that the robot has double modes of remote control operation and self obstacle avoidance running.

Ninthly, the present invention is provided with visual sensing system and voice processing system so that the robot can extend visual recognition and voice recognition functions.

DETAILED DESCRIPTION OF THE PREFERRED EMBODIMENTS

Figure 1:
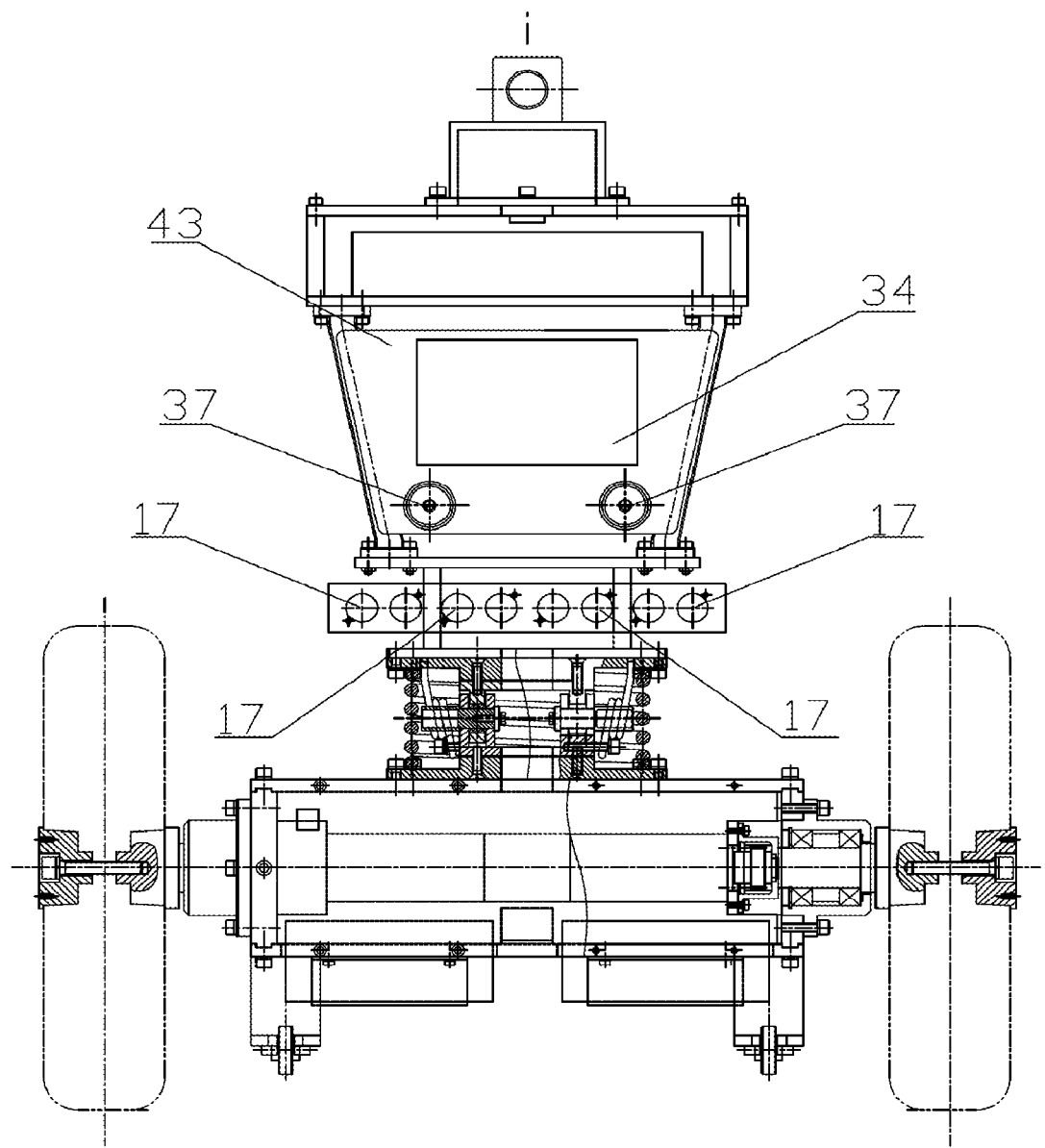
FIG. 1 shows the front view of the mechanical structure of the flexible two-wheeled self-balancing robot.

The embodiments are detailed hereinafter in combination with the drawings.

I. Hardware of the Flexible Two-Wheeled Self-Balancing Robot

1. Type Selection of the Electric System

The main controller 1 selects the EVOC embedded computer (EPC) EC5-1717CLDNA. The system is a high performance, single-board computer adopting the Intel915GM chip set with 1.6 GHz Pentium M processor on board, 256 MB DDR2 533 memory, integrated VGA Card and Sound Card, and various interfaces. The hard disk 38 of EPC is Toshiba anti-shock hard disk MK4036GAC with a storage capacity of 40 GB, and can withstand a maximum of 2.0 G vibration and 200 G instantaneous impact.

The motion controller 2 selects Cyclone MSK2812 system board. This system is a 5V DC power supply and the processor of the system adopts TMS320F2812 DSP of TI Company.

The MSK2812 emulator 39 selects Cyclone XDS510USB, USB 2.0 interface.

The auxiliary controller 3 selects SPCE061A system board of Sunplus Technology Company Limited, the system is 5V DC power supply, the processor is 16-bit u'nSP™ microprocessor with microphone 36 on board, thus realizing voice recognition function.

The servo drivers 4 select AJC55-18 of Copley Motion. The AJC55-18 can be used in position, rotation speed and torque control, the external controller can realize servo control on target motors in simulation modes (±10V, torque, speed and position), PWM (torque and speed), and pole PWM modes (torque and speed). The AJC55-18 can realize communication with the PC system through serial ports and set working modes and controller parameters.

The LCD 17 selects B084SN0 of AU Optronics Corp. with 3.3 v power supply and resolution of 800*600. The interfaces include LVDS ports and backlight cables. The backlight (40) inverter of the LCD selects Mitsubishi T511024.04 with 5V DC power supply.

The speaker 37 selects a pair of passive speaker units with the power of 2 W.

The tilt-meters 15, 18 select CXTA-01 of Crossbow Company. It mainly adopts high-stable silicon micro-machined capacitance inclination sensors and outputs inclination angles by means of simulation signals. The measurement range of the CXTA-01 is ±75° with resolution of 0.05°, the band width of 125 Hz, 8-30V DC power supply, output voltage of 0-5V and null position voltage of 2.5V.

The gyros 16, 19 select CRS03 of Silicon Sensing Systems Japan. The CRS03 angular speed sensors were made based on MEMS technology, can maintain outstanding performance in violent shock and vibration conditions. It has low temperature drift and good repeatability. The main parameters are as below: measuring range of ±100°/s, DC power supply of 5V, null position voltage of 2.5V, measuring resolution of 20 mV/°/s and band width of 10 Hz.

The array composed of four Parallax PING))) ultrasonic sensors 17 is selected to work as obstacle avoidance sensors. The PING))) adopts 5V DC power supply, has an ultrasonic transmitting module and a receiving module and measures the distance through the echo transmitting time after reflection since ultrasonic pulse runs into an object. The measuring range of the PING))) is 2 cm-3 m and the resolution is <1 cm.

The visual sensors of the robot select USB interface CMOS and a camera 12 of 130 MP.

The remote control system consists of a remote controller 33 and a remote receiver 27 with 3V and 5V power supply respectively and remote control distance of 20 m. The remote controller 33 has 12 keys. When a key is pressed, the four interfaces of the remote receiver 27 will output different level combinations.

The driving motors 5 of the robot select DC motorsRE40 packages of Maxon Corp. with the motor of 24V power supply, rated power of 150 W, 26:1 planetary gear reducer equipped, maximum output torque of 7.5 Nm, incremental opto-electrical encoders 20 equipped on the back of the motors and precision of 1000 lines.

The power supply of the robot is a 24V 9Ah Ni-MH rechargeable battery 28. 29 is power relay board. The voltage transformation module on the OP-DC01 transforms the 24V DC input into 5V DC output to supply power for related devices. ATX power adapter 41 for 24V DC input customized can output ATX/AT interface power and supply power for the main controller 1, the hard disk 38 and the backlight inverter 40. When detecting the voltage lower than 22.5V, the MCU on the power monitor board 30OP-DY01 controls the buzzer for an alarm.

2. Mechanical Structure and Layout of Electric Elements

The invention in this embodiment is with a total weight of 20 kg, the height of 700 mm, the width of 400 mm, the length of 150 mm and the wheel diameter of 250 mm. The mechanical structure and layout of electric elements for the robot are as below:

As shown in FIG. 1, 2, 3, the truck part 6 is an aluminium alloy frame composed of the upper, middle and lower three layers. The upper layer of the truck is a hollow drawer frame with an opened front and back, and the main controller 1 is fixed in side and a camera 12 is fixed on the top board 11 through the hollow cylindrical bracket 42. The middle layer of the truck 6 is divided into four smaller layers by three acrylic baffle plates 14, wherein the most upper layer is for mounting the hard disk 38, the auxiliary controller 3 and the remote receiver 27, the second layer is for installing the ATX power adapter 41, the third layer is for placing the power relay board 29 and the power monitor board 30, and the fourth layer is for configuring the backlight inverter 40. Acrylic panels are installed around the middle layer of the truck so as to protect the internal electronic elements and prevent the baffle plates 14 in the middle from dropping, wherein the LCD 34 and speaker 37 are fixed on the front panels 43. The lower layer of the truck is a hollow drawer frame with opened front and back with tilt-meter 15 and gyro 16 installed inside. A forward-facing strap support 44 is fixed on the front end of the bottom frame for installing four ultrasonic sensors 17.

Figure 5:
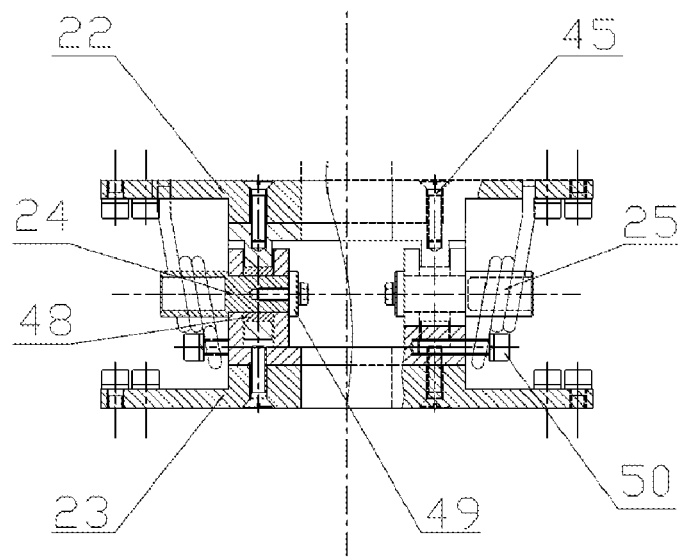
FIG. 5 shows the front view of the elastic joint structure of the flexible two-wheeled self-balancing robot.
Figure 6:
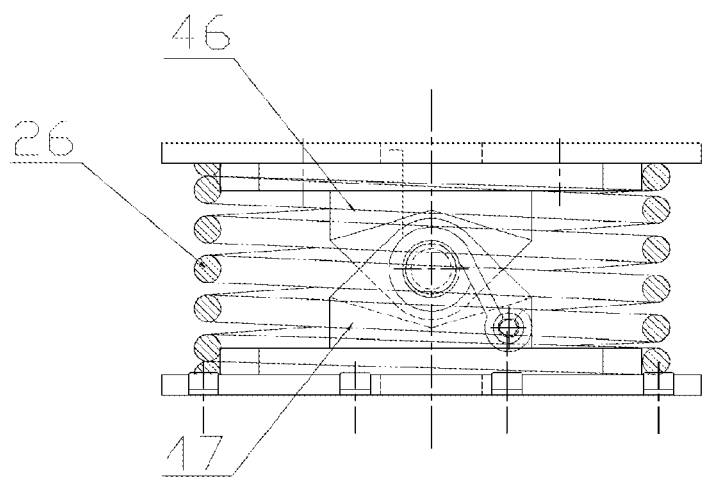
FIG. 6 shows the side view of the elastic joint structure of the flexible two-wheeled self-balancing robot.
Figure 7:
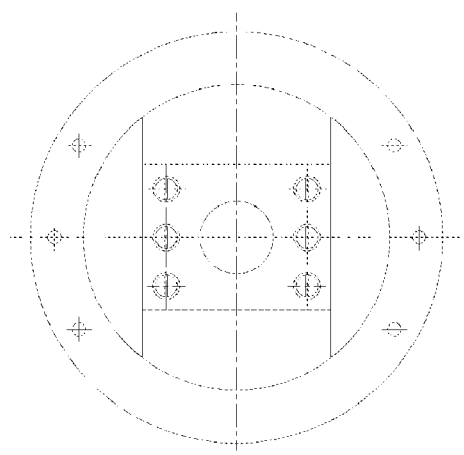
FIG. 7 shows the top view of the elastic joint of the flexible two-wheeled self-balancing robot.

The bottom plate 13 of the truck and the top plate of the chassis 8 are connected by a flexible pitching joint 7. The structure of the elastic joint 7 is as shown in FIG. 5, 6, 7: the upper and lower discs 22, 23 are on the top and at the bottom, the section is in convex shape and the through holes in the center of the discs are used to pass through cables. On the boss club surface of the upper supporting disc, the upper seat 46 is fixed by countersunk screws 45. Through hole is drilled in the center of the rectangular bottom plate of the upper seat 46. Its diameter is the same as the through hole diameter of the supporting disc. The two holes are concentric when assembled. Both sides of the bottom plate of the upper seat 46 are provided with a seat wall in upright dome angle cutting-edge shape with concentric through hole on the top. In the location same as the lower supporting disc 23, the lower seat 47 is installed in the same method. The difference of the lower seat 47 from the upper seat 46 is that the two side walls are dual-layer type so as to closely fit in with the clearance on the side wall of the upper seat 46. Moreover, the through hole diameter of the lower seat wall 47 is slightly low. After the copper sleeve 48 is inserted into the through holes in the two side walls of the upper seat 46 respectively, it is the same as the through hole diameter of the side wall of the lower seat 47. When assembling the upper and lower seats 46, 47, the through hole on the both side walls is concentric. Insert the rotating shaft 24 respectively and fix it by baffle plate 49 so that the upper supporting disc 22 and lower supporting disc 23 can rotate by taking the rotating shaft 24 as a hinge point. A two-arm torsion spring 25 passes through the outside of the two rotating shafts 24 respectively. The upper arm of the torsion spring 25 is fixed in the card slot of the upper supporting disc 22. The round hook at the end of the lower arm of the torsion spring is fixed on the side wall of the lower seat 47 through screws 50. When assembling the upper and lower seats 46, 47, a section of cylindrical spring 26 is held down and fixed between the upper and lower supporting discs 22, 23. The both ends are sleeved outside the boss club of the upper and lower supporting discs 22, 23 respectively.

Figure 2:
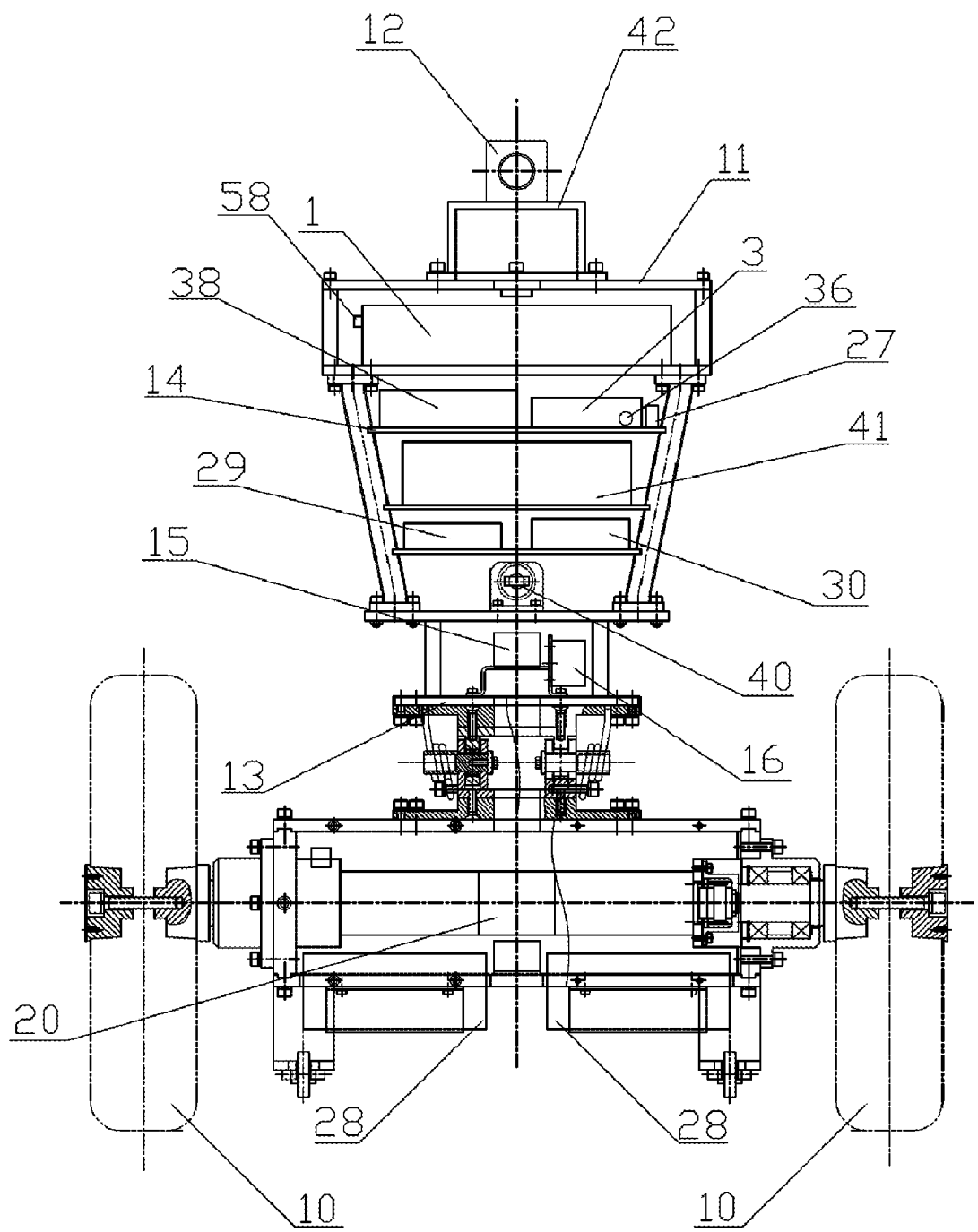
FIG. 2 shows the schematic diagram of the electronic elements' layout of flexible two-wheeled self-balancing robot.
Figure 3:
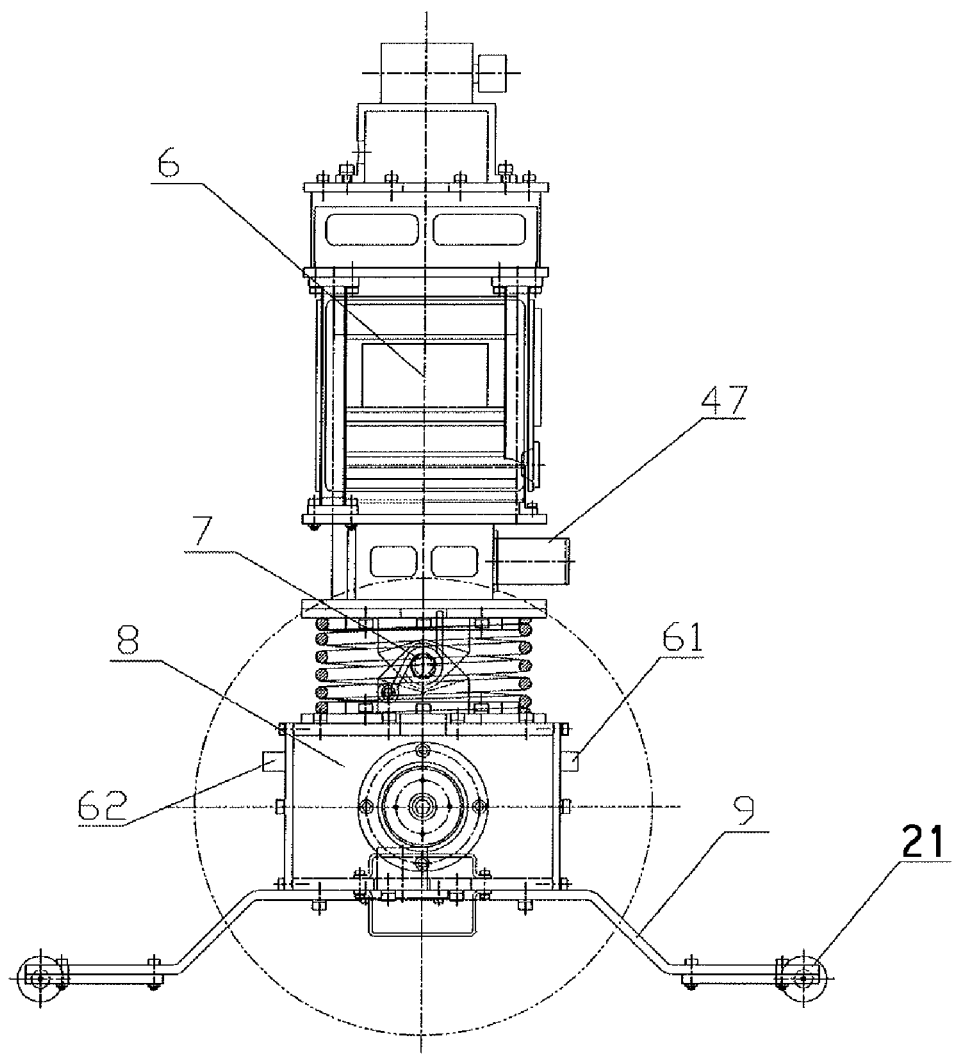
FIG. 3 shows the side view of the mechanical structure of the flexible two-wheeled self-balancing robot.
Figure 4:
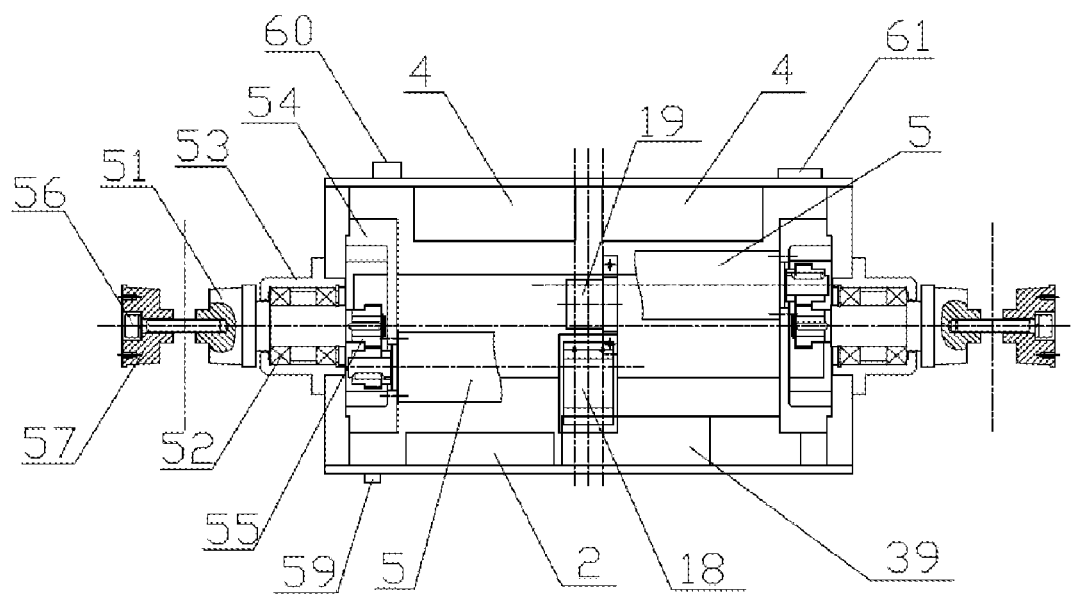
FIG. 4 shows the top view of the chassis of the flexible two-wheeled self-balancing robot.

As shown in FIG. 2, 4, the chassis part 8 of the robot is a box structure made of aluminium alloy. A group of shafts are set in the center on each side of left and right of the chassis, mainly including rotating shaft 51, bearing 52 and bearing seat 53. In the middle of the interior of the chassis 8, the motors 5 for the left and right wheels are fixed outside the driving gear box in staggered arrangement in the front and rear locations. The shafts of the motors are coupled with the rotating shaft 51 of the shaft through the driving gear 55. The rotating shaft 53 is connected with the lynchpin 57 by using screws 56 and fixing wheel 10 is clamped between them. In the chassis 8, the motion controller 2 and the emulator 39 is installed in the front end, the motor servo controller 4 is installed in the rear end, and tilt-meter 18, gyro 19 and battery 28 are installed at the bottom. Two removable protective frames 9 are installed at the bottom of the chassis 8; the truckle 21 at the end of the support is suspended when the robot is in upright state, and the truckle can support and protect the chassis when it touches the ground in inclined state.

3. Connection of Electric System

Figure 8:
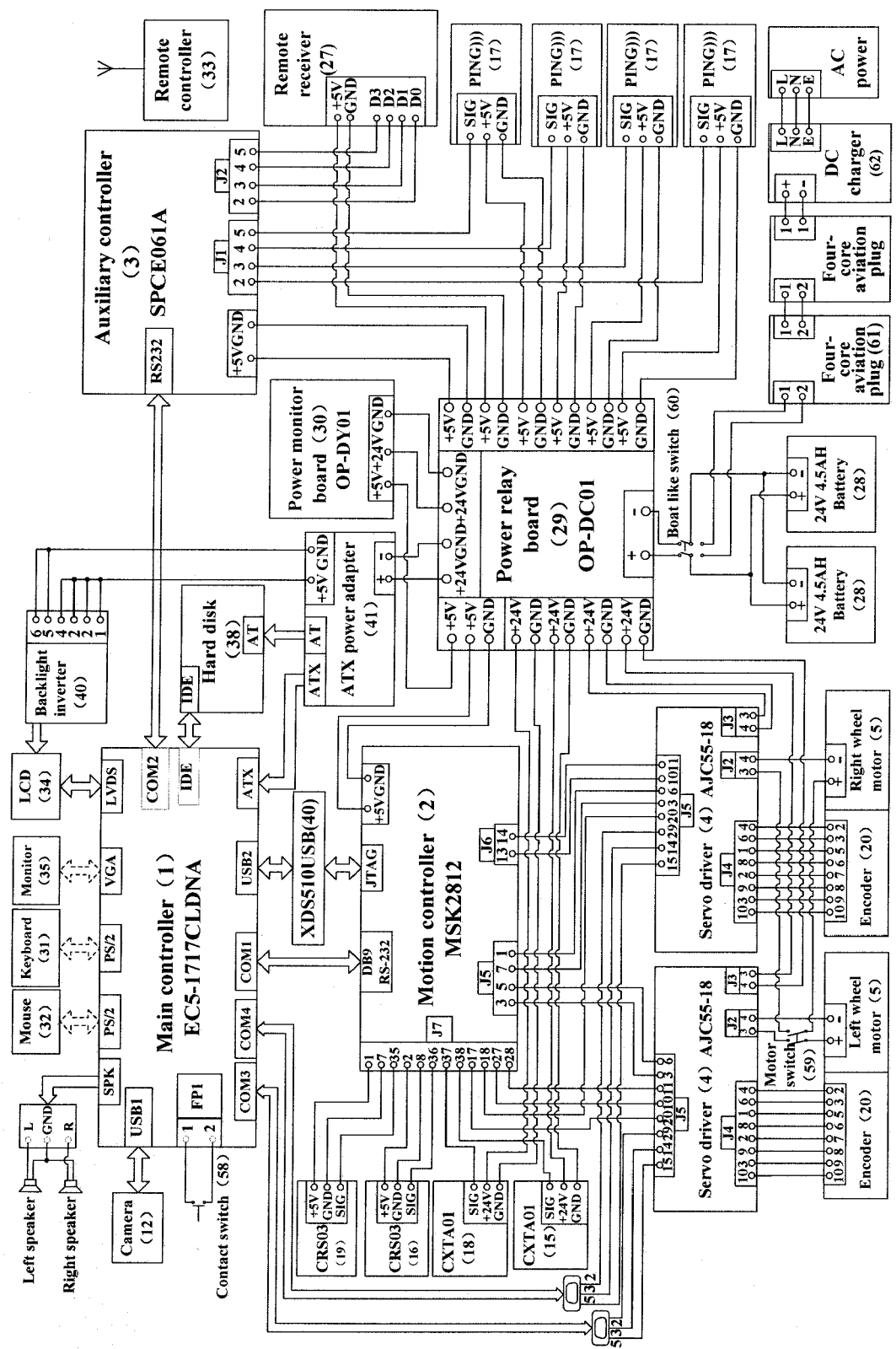
FIG. 8 shows the connection scheme of the electric system of the flexible two-wheeled self-balancing robot.

As shown in FIG. 8, the various parts of the electric system are connected by the methods below:

The EC5-1717CLDNA is connected with a hard disk 38 to form the main controller 1; between the pin 1 and 2 of the EC5-1717CLDNA panel interface FP1, contact switch 58 is set in serial connection to work as startup button. The ATX power adapter 41 connects the EC5-1717CLDNA to supply power.

The four RS232 serial ports COM1, COM2, COM3, COM4 of the EC5-1717CLDNA are connected with MSK2812, SPCE061A and two ACJ55-18 serial ports. Moreover, the EC5-1717CLDNA is connected with the XDS510USB of the emulator 39 of the DSP through the USB interface. The emulator 39 is further connected with the JTAG interface of the DSP.

The USB1 of the EC5-1717CLDNA is connected with the camera 12, the SPK interface is connected with the speaker 37 and the LVDS interface is connected with the LCD 34. One end of the backlight inverter 40 is connected with the backlight power cable of the LCD 34, the lines 1, 2, 3, 4 of the other end is connected with the DC 5V output of the ATX power adapter 41, the lines 5, 6 are connected with the GND of the ATX power adapter 41.

Moreover, when the robot stops motion, the EC5-1717CLDNA can connect the keyboard 31, the mouse 32 and the monitor for programming and debugging.

The MSK2812 board adopts +5V output power supply of the power relay board. The pins 38, 37, 36, 35 of the J7 interface, namely, A/D conversion output channel, are connected with the simulation signal output terminals of the two tilt-meters (CXTA01) 15, 18 and two gyros (CRS03) 16, 19 respectively; the two gyros 16, 19 are respectively connected with the pins 1 and 7 of the J7 interface of the MSK2812, namely, +5V output power supply; the tilt-meters 15, 18 adopt direct 24V power supply of the power relay board.

The connection between the MSK2812 and two servo controllers (AJC55-18) 4 includes a control signal line and encoders feedback signal line. The control signal includes a motor activation signal, motor turning direction signal and PWM rotating speed control quantity signal, wherein the pins 3, 7 of the J5 interface of the MSK2812 are connected with the pin 3 of the J5 interface of the AJC55-18 for the motors on the left and right respectively so as to work as AJC55-18 activation signal line; the pins 5, 1 of the J5 interface of the MSK2812 are connected with pin 6 of the J5 interface controlling the AJC55-18 of the motors on the left and right so as to work as the turning direction selection signal line of the motors; the pins 17, 18 of the J7 interface of the MSK2812 are PWM output, and connected with pin 20 of the J5 interface controlling the (AJC55-18) 4 of the motors 5 on the left and right so as to work as the rotating speed control quantity control line. The feedback signal of the encoders 20 of the left, right motors is connected to the MSK2812 through the AJC55-18 buffer. The pins 10, 11 of the J5 interface of the AJC55-18 for the motors on the left and right are respectively connected with the pins 27, 28 of the J7 interface and pins 13, 14 of the J6 interface of the MSK2812.

The two pins 3, 4 of the J3 interface of the AJC55-18 are power output terminal, and they are connected with the +24V power of the power relay board 29 and the GND respectively; the pins 3, 4 of the J2 interface are output terminal of the control voltage, and they are connected with the +/−output terminal of the motors respectively, wherein a motor switch 59 is set in serial connection between the pin 3 and the motor+output terminal; the pins 4, 6 of the J4 interface are +5V and GND respectively, and they are connected with the lines 2, 3 of the encoders 20 respectively, the pins 1, 8, 2, 9, 3, 10 of the J4 interface are the common-mode output terminal of channel A, channel B and zero signal of the encoders, and they are connected with the lines 5, 6, 7, 8, 9, 10 of the encoders bus bar.

The SPCE061A adopts +5V output power supply of the power relay board 29. The pins 2~5 of its J1 interface are connected with the signal ends of the ultrasonic sensors 17, 1#~4# respectively; the pins 2~5 of the J2 are connected with the output D0~D3 of the remote receiver 27 respectively.

Two 24V4.5Ah Ni-MH battery packs form 24V9Ah battery 28 in parallel connection. The battery 28 is connected with the power relay board 29 and the charger jack 61 respectively through a dual-pole dual-throw boat like switch 60. When the boat-like switch 60 is shifted from "OFF" to "ON" position, the battery begins to supply power; when it is shifted to "charging", the external DC charger 62 charges power to the battery.

The +/−input terminal of the power relay board 29 connects the +/−terminal of the battery pack 28. Two types of 24V and 5V DC output are provided and connected with the power supply terminals of corresponding devices.

The Vd, GND and Vin of the power monitor board 30 are connected with +5V, GND and +24V of the power relay board 29 respectively.

4. Working Principles of the Electric System

Figure 9:
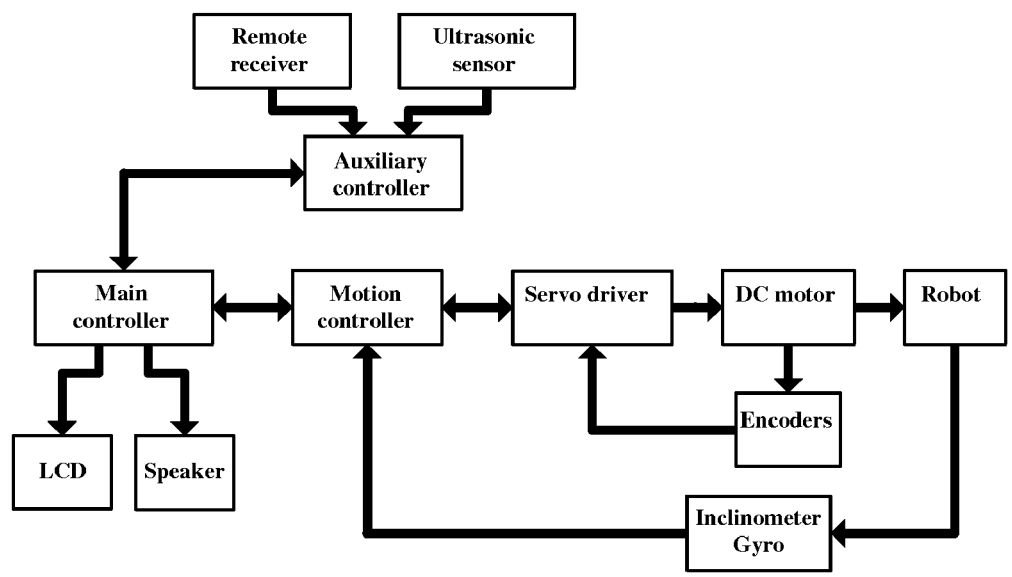
FIG. 9 shows the principles of the electric system of the flexible two-wheeled self-balancing robot.

The main function of the robot in this embodiment is to perform walking, turning and other motions under the premise of maintaining the pitching attitude, thus balancing of the robot body, wherein such motions can be the self intelligent behavior decided by the robot itself, or the operation command motion issued by the user instantly. Therefore, the working principles of the electric system of the robot are as shown in FIG. 9: the main controller 1 of the robot reads the feedback information of various sensors and remote control operation commands from the motion controller 2 and auxiliary controller 3 through the serial port, and displays them on the LCD 34, and then calculates the motion control commands according to motion behavior decision algorithm, and then issues the commands to the motion controller 2 via the serial port; the motion controller 2 gets the feedback signal of the tilt-meters 15, 18 and gyros 16, 19 via A/D conversion module, then further reads the feedback signal of the encoders 20 via the relay of the servo drivers 4, afterwards, comprehensively receives the control commands and feedback signal, calculates the torque control quantity of the motors as per preset motion balancing control algorithm, and sends a corresponding PWM signal to the servo drivers 4 for implementation; the servo drivers 4 control the motors 5 for motion, then the motors 5 drive the wheels 10 so that the robot maintains its body balance and moves according to the control commands of the main controller 1.

II. The Motion Control Method of the Robot System

The embodiment shows how the flexible two-wheeled self-balancing robot realizes two motion modes of self obstacle avoidance and remote control operation to control the system. For other control functions, such as robot intelligent behavior decision and voice operation, refer to the software of the embodiment and add corresponding modules for design.

Figure 10:
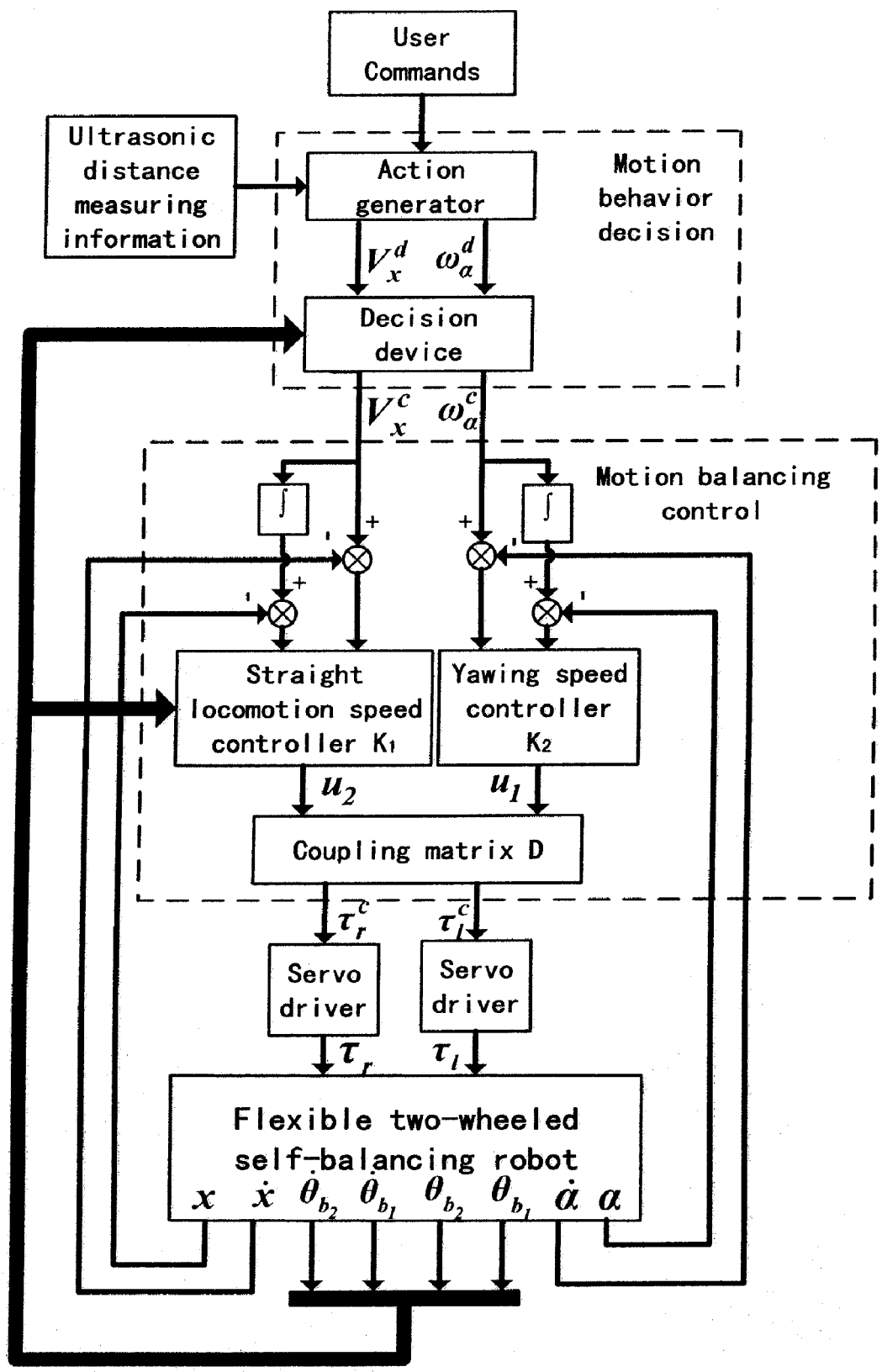
FIG. 10 is the block diagram of the motion control system of the flexible two-wheeled self-balancing robot.

FIG. 10 is the block diagram of the control system which can realize two motion modes, one is self obstacle avoidance motion mode, the other is remote control operation motion mode, wherein the motion mode can be selected by the keys on the remote controller; the motion of the robot is described by behavior collection, including: forward, backward, turn left, turn right, upright standing, left and right rotation; action is completed by controlling the straight locomotion speed $V_x$ and yawing speed $\omega_\alpha$, wherein the control commands are as shown in the table below:

|  | Forward | Backward | Turn left | Turn right | Left rotation | Right rotation | Upright standing |
|---|---|---|---|---|---|---|---|
| $V_x^c$ | v | −v | v/2 | v/2 | 0 | 0 | 0 |
| $\omega_a^c$ | 0 | 0 | −2 v/D | 2 v/D | −2 v/D | 2 v/D | 0 |

The v in the table takes 0.1 m/s, and D, the distance of two wheel centers, takes 0.4 m.

The whole control system is realized by four parts of software running the main controller 1, motion controller 2, auxiliary controller 3 and the servo driving controller 4.

1. Monitor Program in the Main Controller 1

The monitor program RobotControl.exe in the main controller 1 is the applications of the Windows system developed by Visual C++ software. The program can monitor the remote control commands (remote control input value $R^c$) and the robot running state (linear speed $V_x$, rotating angle speed $\omega_a$, attitude angles $\theta_1$ and $\theta_2$ of the chassis and the truck, attitude angular speed $\dot\theta_1$ and $\dot\theta_2$, ultrasonic sensors distance measuring information $D_{S1}$-$D_{S4}$) at real time, and realize the motion behavior decision making of the robot. The core part of the program is serial communication and motion behavior decision.

The contents of the serial communication include the control commands issued by the main controller 1 to the motion controller 2, and the robot state information uploaded by the motion controller 2 and auxiliary controller 3 to the main controller 1. The communication mode is asynchronous serial communication and the communication protocol is: serial port transmission baud rate of 19200, each frame of 8-bit data bit, no parity check and 1 stop position. The formats of the control command data package of the motion controller 2 issued by the main controller 1 include: <F0h, F0h, V, data, W, data, data package length value, FFh and FFh>, wherein the data package length value is integer variable, the symbol "V" represents the straight locomotion speed control command $V_x^c$ of the robot, the symbol "W" represents the yawing speed control command $\omega_a^c$ of the robot, and "data" are their corresponding floating-point variable value.

The formats of the state information data package received by the main controller 1 include: <F0h, F0h, data code, data, data code, data, ... data package length value, FFh and FFh>, wherein the data package length value is integer variable, and the data codes and corresponding data name are as shown in the table below:

| Data name | $\theta_1$ | $\dot\theta_1$ | $\theta_2$ | $\dot\theta_2$ | $V_x$ | $\omega_a$ | $D_{S1}$ | $D_{S2}$ | $D_{S3}$ | $D_{S4}$ | $R^c$ |
|---|---|---|---|---|---|---|---|---|---|---|---|
| Data code | F1h | F2h | F3h | F4h | F5h | F6h | F7h | F8h | F9h | FAh | FBh |

The data other than $R^c$ in the table are floating-point type, the $R^c$ is the remote control command code, and the code value and its corresponding remote controller keys as well as the defined functions are as shown in the table below:

| Code | Key | Function |
|---|---|---|
| 00h | 1 | Reserve |
| 01h | 2 | Self obstacle avoidance mode |
| 02h | 3 | Remote control operation mode |
| 03h | 4 | Forward |
| 04h | 5 | Backward |
| 05h | 6 | Turn left |
| 06h | 7 | Turn right |
| 07h | 8 | Left rotation |
| 08h | 9 | Right rotation |
| 09h | 10 | Upright standing |
| 0Ah | 11 | Reserve |
| 0Bh | 12 | Reserve |

This embodiment adopts open-source serial-port CSerial to realize serial operation. Download the related codes and description on the website http://codegure.earthweb.com/network/serialpot.shtml.

The block diagram of the motion behavior decision control of the robot is marked in FIG. 10. It is as follows in specific: run the generator to inquire the parameter of the current running mode (the default is remote control operation mode), if in self obstacle avoidance running mode, inquire the latest ultrasonic measured distance, select the action according to the preset action rules; if in remote control operation mode, the program will inquire the remote control input commands and directly select corresponding action from the motion collections (the default is upright standing); afterwards, select the expected straight locomotion and yawing speed control commands $V_x^d$, $\omega_a^d$ corresponding to the actions and output to the decision device; the decision device then reads the latest 10 values of the attitude angles $\theta_1$ and $\theta_2$, attitude angular speed $\dot\theta_1$ and $\dot\theta_2$ of the chassis and truck received, calculates their mean square value $\Delta_1$, $\Delta_2$, $\Delta_3$, $\Delta_4$, if the $((\Delta_1>25)\wedge(\Delta_2>25))\vee((\Delta_3>2500)\wedge(\Delta_4>2500))$ is a true value, it is considered the attitude of the robot is unstable, the control commands output by the decision device are $V_x^c=\omega_a^c=0$, namely, the robot is ordered to keep upright standing, if the $((\Delta_1>25)\wedge(\Delta_2>25))\vee((\Delta_3>2500)\wedge(\Delta_4>2500))$ is a false value, the control commands output by the decision device are $V_x^c=V_x^d$ and $\omega_a^c=\omega_a^d$.

Wherein, the behavior rules of the self obstacle avoidance running mode of the robot are directly related with the obstacle distance information fed back the ultrasonic sensors 17, as shown in the table below specifically:

| No. | S1 | S2 | S3 | S4 | Action |
|---|---|---|---|---|---|
| 1 | 1 | 1 | 1 | 1 | Turn left in situ |
| 2 | 1 | 1 | 1 | 0 | Turn right |
| 3 | 1 | 1 | 0 | 1 | Turn right |
| 4 | 1 | 1 | 0 | 0 | Turn right |
| 5 | 1 | 0 | 1 | 1 | Turn left |
| 6 | 1 | 0 | 1 | 0 | Turn right |
| 7 | 1 | 0 | 0 | 1 | Turn left |

-continued

| No. | S1 | S2 | S3 | S4 | Action |
|---|---|---|---|---|---|
| 8 | 1 | 0 | 0 | 0 | Turn right |
| 9 | 0 | 1 | 1 | 1 | Turn left |
| 10 | 0 | 1 | 1 | 0 | Turn left |
| 11 | 0 | 1 | 0 | 1 | Turn left |
| 12 | 0 | 1 | 0 | 0 | Turn right |
| 13 | 0 | 0 | 1 | 1 | Turn left |
| 14 | 0 | 0 | 1 | 0 | Turn left |
| 15 | 0 | 0 | 0 | 1 | Turn left |
| 16 | 0 | 0 | 0 | 0 | Forward |

In this table, S1-S4 represents four ultrasonic sensors 17 in front of the robot from left to right. When the value $D_{S1}$ measured by the S1 is less than 1 m, S1=1, otherwise S1=0, S2-S4 are evaluated in the same way.

Figure 11:
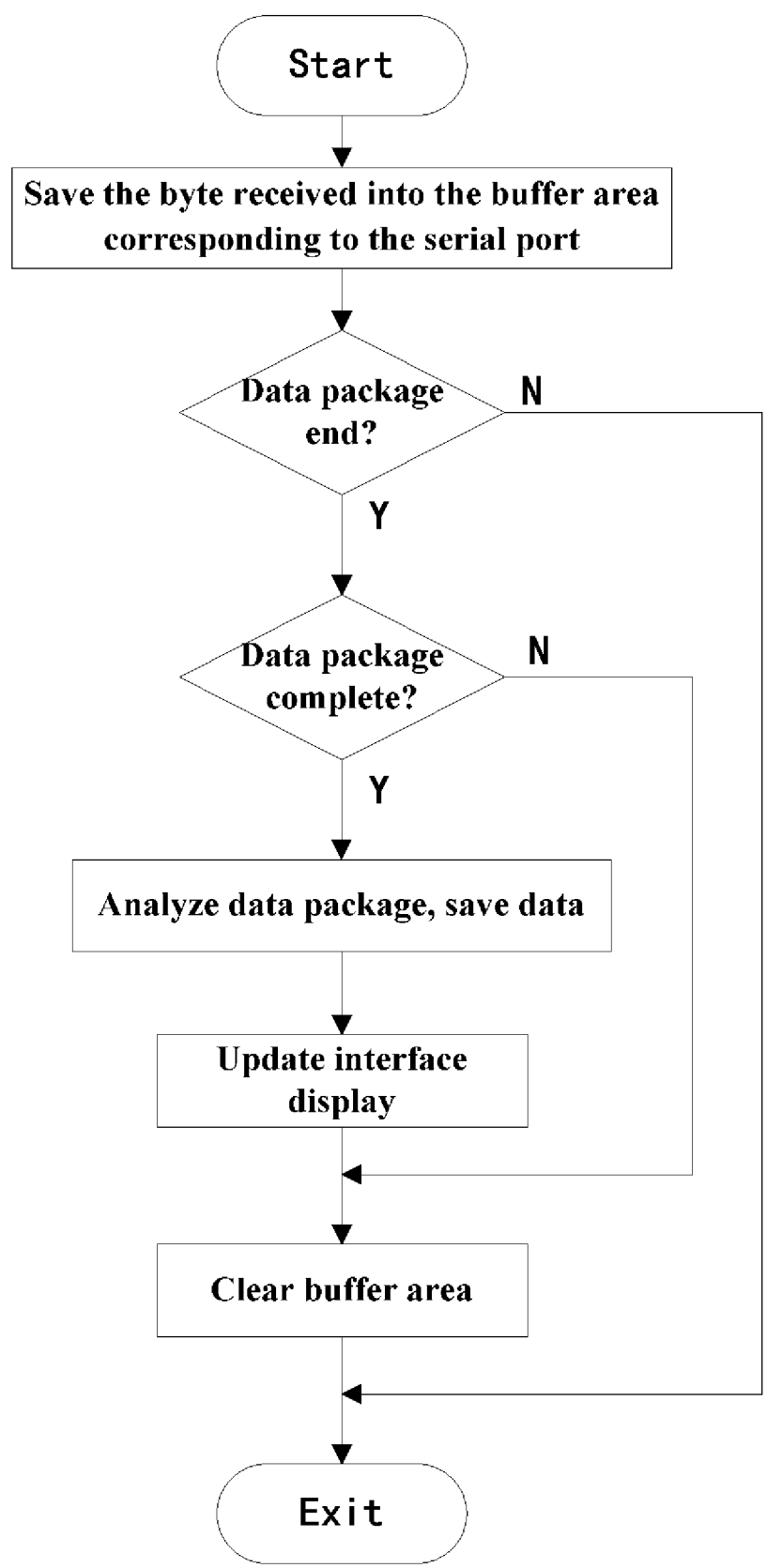
FIG. 11 shows the flow chart of the main controller monitoring software serial port receiving message processing function.
Figure 12:
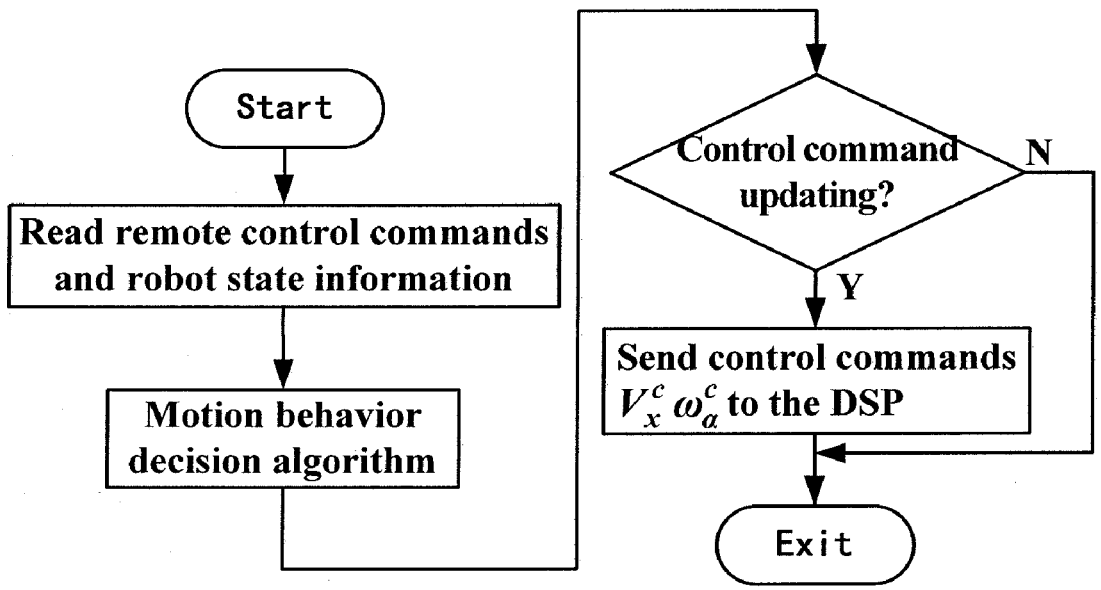
FIG. 12 shows the flow chart of the main controller monitoring software timer message processing function.

The flow of the monitor program is as follows: after program startup, the main thread initializes the serial ports COM1, COM2 (mainly set baud rate of 19200, 8-bit data bit, no Parity Check, 1 stop position, 512 byte in buffer area), creates and starts their respective serial port monitor thread, sets 1000 ms Timer, and finally, processes the messages in message array in unlimited circulation. When the COM1 or COM2 receives a byte, the serial port monitor thread will transfer this byte to the main thread by means of a message, the main thread runs the message process function OnCommunication1 or OnCommunication2 corresponding to the message after response to the message (program flow as shown in FIG. 11). The byte received in the function is read into the buffer area and judges whether the byte is the end of the data package; if not, it exits from the message processing function; but if it is, it judges whether the data package length value is correct; if not correct, it gives up the data package, clears the buffer area and exits from message processing function; but if correct, it analyzes the data package according to serial port communication protocol, takes out the state data and saves them to the storage area, updates the display information corresponded in the window, clears the buffer area and exits from message processing function. When the timer reaches 1000 ms, it sends a message to the main thread, the main thread then runs the message processing function OnTimer after response (program flow as shown in FIG. 12), in the function, read the state information of the user commands and the robot in the storage area, and calculate the control commands $V_x^c$, $\omega_\alpha^c$ according to the motion behavior decision algorithm; if the control commands are inconsistent with the result calculated by the last timing program, exit from the function after issuing new control commands to the motion controller (2) via the serial port COM1, but if consistent, directly exit from the function.

2. Control Software in the Motion Controller 2

The program of the motion controller 2 adopts CCS software developed by TI Company and solidified in the storage unit. The program receives the control commands of the main controller 1 by means of the SCI receiving interruption, and realizes the real time control of the attitude balancing and motion of the robot by means of 25 ms timing interruption, and sends state data to the main controller 1 after each timing interruption, wherein the priority of the timing interruption is higher than that of the SCI receiving interruption. This embodiment gives the algorithm flow of the main program and interruption program, relating to the real-life realization of the DSP resource configuration and utilization, serial port receiving, transmitting operation. The example provided by TI Company to the TMS320F2812 DSP can be directly referred to.

Figure 13:
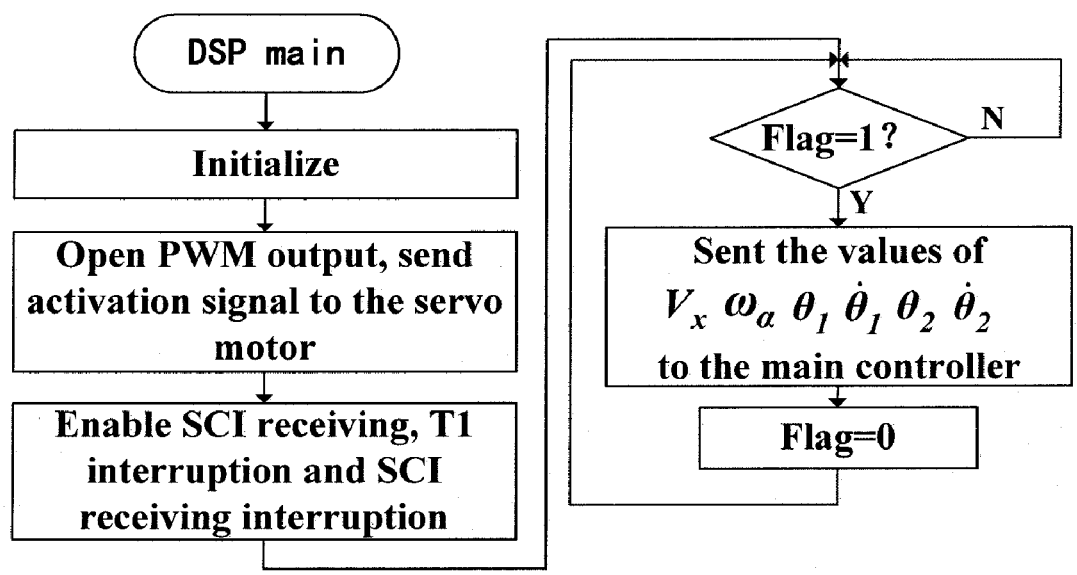
FIG. 13 shows the flow chart of main program of the motion controller.

The flow of the main program is as shown in FIG. 13: firstly perform necessary initialization, complete the initialization used by the program, configure various register states of the DSP, mainly configure the IO terminal and A/D channel, general timer T1-T4 required by control (set and start T1 as interrupted cycle time, T2, T4 as encoders time, T3 as comparison time of PWM signal output), SCI (set baud rate of 19200, 8-bit data bit, no parity check, 1 stop position, receiving/transmitting enabling FIFO buffer, etc.); afterward, open PWM output, send activation signal to the servo drivers; and then the activation SCI receiving terminal RX, T1 time interrupted, SCI receiving interrupted; in the end, perform unlimited circulation and wait for the interruption, in each circulation, judge whether the running marking variable Flag of the timing interrupted program is 1, if not, no operation is made, if it is 1, send the values of $\theta_1$, $\dot\theta_1$, $\theta_2$, $\dot\theta_2$, $V_x$ and $\omega_\alpha$ to the main controller 1 according to the serial port communication protocol via the serial port, and then set the Flag to 0.

Figure 14:
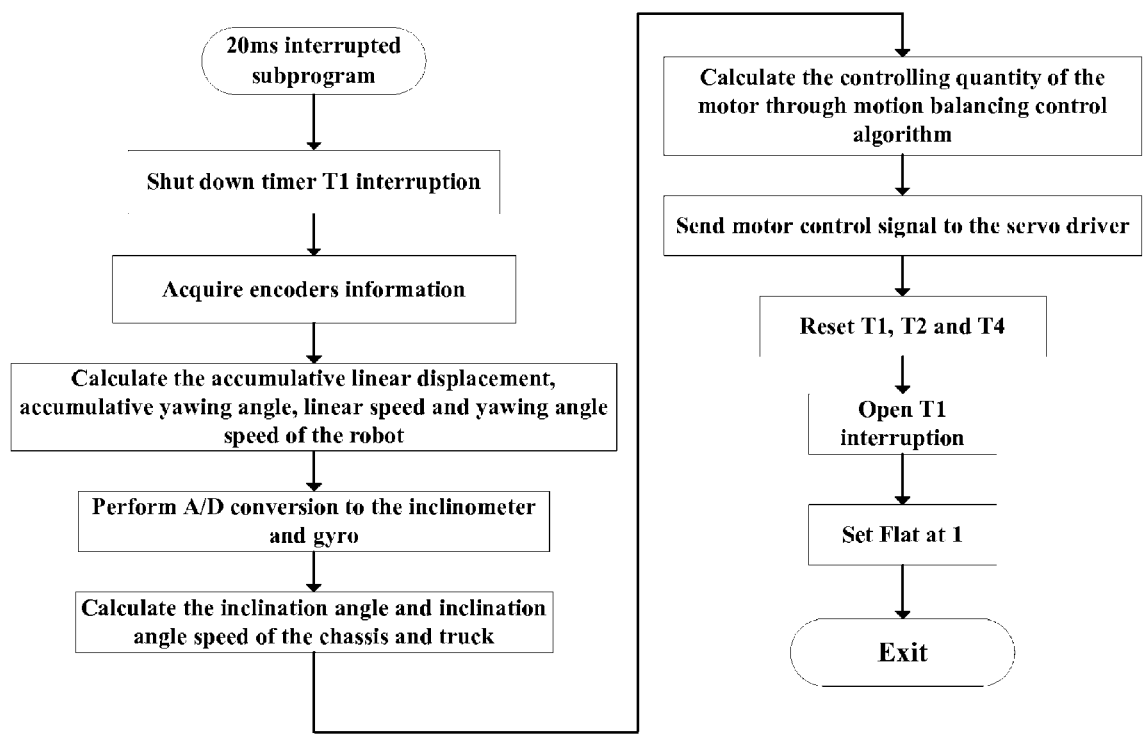
FIG. 14 shows the flow chart of the motion controller interrupting control program at definite time.

When the receiving FIFO buffer of the SCI receives a byte, an interruption occurs, the CPU saves the current program site after response and then switches to the SCI to receive the interrupted program. As shown in FIG. 14, the SCI receives the interruption program by the following flow: firstly, stop the SCI receiving interruption; secondly, read a byte from the FIFO buffer; thirdly, judge whether this byte is the end of the data package, if not, save the byte and return to the second step to read the next byte, if it is, judge whether the data package length is correct, if not correct, give up the data package and execute the next step, but if correct, analyze the data in the data package, take out the values $V_x^c$ and $\omega_\alpha^c$ for saving; fourthly, clear the receiving FIFO buffer; finally, open SCI interruption and exit from the interrupted program.

Figure 15:
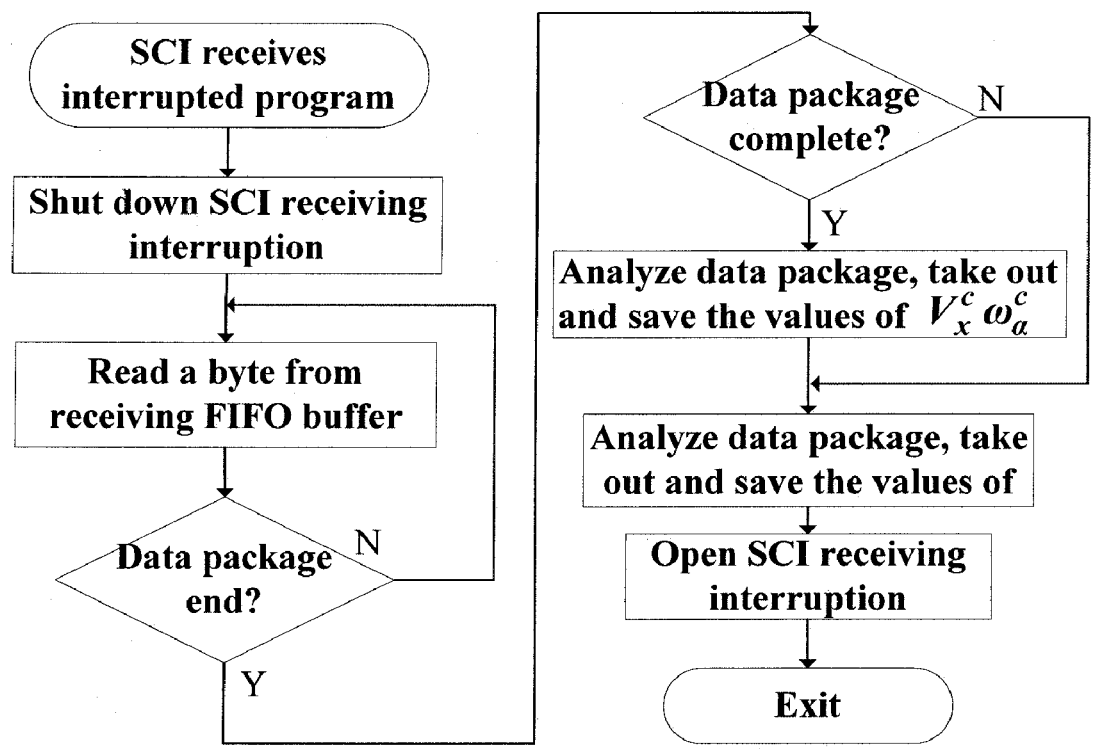
FIG. 15 shows the flow chart of the motion controller SCI receiving interruption program.

Once T1 timing get at 25 ms, an interruption occurs, the DSP saves the current program site after response to the interruption, and then switches to timing interrupted program. As shown in FIG. 15, the flow of the timing interruption program is as follows:

Step 1: stop timer T1 interruption.

Step 2: acquire the encoders information. Each encoder output signal is two groups of orthogonal coding sequences. The orthogonal coding pulse circuit in the DSP takes count for the rising edge and the falling edge of the two groups of signals. Therefore, the time frequency generated is four times of each group of input sequence, so the value read from the general timer T2, T4 must be divided by four to get the pulse values $n_l$, $n_r$ output by the encoders within one cycle.

Step 3: calculate the accumulative linear displacement, accumulative yawing angle, linear speed and yawing angular speed of the robot. According to encoder information, the angle rotated by each wheel in one cycle $\phi=n\cdot2\pi/1000/26$. Due to the very short control cycle T (25 ms), the wheel rotating speed approximately calculated $\omega=\phi/T$. By referring to the kinematical equation of the robot, the linear speed $V_x=(\omega_l+\omega_r)\cdot R_w/2$, the turning speed $\omega_\alpha=2(\omega_l-\omega_r)\cdot R_w/D$, wherein $\dot\phi_l$ is the rotating speed of the left wheel, $\dot\phi_r$ is the rotating speed of the right wheel, D is the distance between the two wheels and $R_w$ is the radius of the wheels. Because of the very short control cycle T, the result of $V_x$ multiplying by T is accumulated to the accumulative linear displacement of the last control cycle to get the current accumulative linear displacement, namely $x(t)=x(t-T)+V_x T$, and the accumulative yawing angle can be calculated by the same way, namely $\alpha(t)=\alpha(t-T)+\omega_\alpha T$.

Step 4: according to the sequence of the tilt-meter 18, gyro 19 of the chassis, tilt-meter 15, gyro 16 of the truck, perform A/D conversion to the simulation voltage signals output by them. To avoid the impact of accidental factors during sampling, each signal is sampled 10 times to perform A/D conversion, the maximum and the minimum are removed and then those left are averaged to give the corresponding variables: $U_{\theta_1}$, $U_1$, $U_{\theta_2}$ and $U_2$.

Step 5: calculate the inclination angle and inclination angle speed of the chassis and the truck. By referring to the formula: $\theta_i=(U_{\theta_i}-U0_{\theta_i})K_\theta, i=1,2$ and $\dot{\theta}=(U_i-U0_i)K_{\dot{\theta},i=1,2}$, calculate corresponding inclination angle and inclination angle speed of the chassis and the truck for the robot, wherein $U0_X$ is zero position voltage set, being 2.5; $K_\theta=8$ and $K=9$ are factor of proportionality, obtained by fixing the two wheels of the robot, rock the robot body and divide the rotating angle and rotating speed measured by the encode by $(U_{\theta_1}-U0_{\theta_1})$ and $(U_1-U0_1)$ respectively in advance.

Step 6: by taking the control commands $V_x^c$ and $\omega_\alpha^c$ as reference input and taking $x\, V_x$, $\alpha$, $\omega_\alpha$, $\theta_1$, $\dot{\theta}_1$, $\theta_2$ and $\dot{\theta}_2$ as the feedback amount, calculate the duty cycle and rotating direction of the PWM corresponding to the control torque of the two motors, wherein the absolute value scope of the torque is [0,5] (Nm), the corresponding duty cycle is 0~100%, when more than zero, it is in positive rotation, while lower than zero, in reverse rotation.

Step 7: refresh the output to the PWM duty cycle of the servo drivers and motor rotating direction.

Step 8: set the timer T1, restart 25 ms time counting, set T2, T4, and restart time counting.

Step 9: open T1 interruption, exit from interruption program.

The motion balancing control algorithm mentioned in Step 6 is as follows: as shown in FIG. 10, the straight locomotion speed controller $K_1$ calculates the linear speed control quantity $u_1$ according to attitude zero deviation and straight locomotion speed deviation, the yawing speed controller $K_2$ calculates the yawing speed control quantity $u_2$ according to the yawing speed deviation, $[u_1\ u_2]^T$ left-multiplies by the coupled matrix D to calculate the motor control torque $[\tau_1\ \tau_2]^T$; the straight locomotion speed controller and the yawing speed controller are designed to select linear second-order optimal control algorithm.

First, decompose the linear state equation of the robot into two single-input subsystems of straight locomotion and yawing motion. According to the characteristics and parameters of the mechanical system of the robot, establish mathematical model and obtain linear state space equation at upright balancing point:

$$\dot{X}=AX+Bu$$

Wherein: $X=[x\ \alpha\theta_{b_1}\ \theta_{b_2\,x\,b_1}\ \dot{\theta}_{b_2}]^T$, $u=[\tau_l\ \tau_r]^T$, $$A=\begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 113.8 & -135.9 & 0 & 0 & 1.4 & -1.4 \\ 0 & 0 & 0 & 0 & 0 & 0 & 0 & 0 \\ 0 & 0 & -123.58 & 137.77 & 0 & 0 & -14.2 & 14.2 \\ 0 & 0 & 100.83 & -102.07 & 0 & 0 & 10.9 & 10.9 \end{bmatrix},$$

$$B=\begin{bmatrix} 0 & 0 \\ 0 & 0 \\ 0 & 0 \\ 0 & 0 \\ 1.5726 & 1.5726 \\ 3.3755 & -3.2755 \\ -9.1867 & -9.1867 \\ 2.4738 & 2.4738 \end{bmatrix}.$$

Thus the state equation of the straight locomotion subsystem can be obtained:

$$\dot{X}_1=A_1 X_1+B_1 u_1$$

Wherein: $X_1=[x\ \theta_{b_1}\ \theta_{b_2}\ \dot{x}\ \dot{\theta}_{b_1}\ \theta_{b_2}]^T$, $$A_1=\begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 113.8 & -135.9 & 0 & 1.4 & -1.4 \\ 0 & -1.2358 & 1.3777 & 0 & -14.2 & 14.2 \\ 0 & 1.0083 & -1.0207 & 0 & 10.9 & 10.9 \end{bmatrix},$$

$$B_1=\begin{bmatrix} 0 \\ 0 \\ 0 \\ 1.5726 \\ -9.1867 \\ 2.4738 \end{bmatrix}$$

Thus the state equation of the yawing motion subsystem can be obtained:

$$\dot{X}_2=A_2 X_2+B_2 u_2$$

Wherein:

$$X_2=[\alpha\ \dot{\alpha}]^T,$$

$$A_2=\begin{bmatrix} 0 & 1 \\ 0 & 0 \end{bmatrix},$$

$$B_2=\begin{bmatrix} 0 \\ 3.3755 \end{bmatrix}.$$

The relations between $u_1$, $u_2$ and u are:

$$u=D\cdot\begin{bmatrix} u_1 \\ u_2 \end{bmatrix}=\begin{bmatrix} 0.5 & 0.5 \\ 0.5 & -0.5 \end{bmatrix}\begin{bmatrix} u_1 \\ u_2 \end{bmatrix}.$$

Secondly, by knowing that the controllability matrixes of both the straight locomotion subsystem and the yawing motion subsystem calculated are full rank, it proves both are completely controllable and various state values of the system are all obtainable by measurement, therefore, by taking $V_x^c$, $\omega_\alpha^c$ as the reference input of two subsystems and states $X_1$, $X_2$ as feedback amount, the motion balancing control system shown in FIG. 10 is constructed, and the state feedback controller for the two subsystems are designed by means of the linear second-order optimal control:

Define the performance indexes of the two subsystems:

$$J_1(u(\cdot))=\int_0^\infty X_1^T Q_1 X_1 + R_1 u_1^2)dt, J_2(u(\cdot))=\int_0^\infty X_2^T Q_2 X_2 + R_2 u_2^2)dt$$

Wherein: $Q_1$=diag[1 100 100 100 10 10] and $Q_2$=diag [1 1] are as the weighted matrix of the state variable, $R_1$=$R_2$=1 is as the weighted coefficient of the control quantity. According to the function K=1qr(A,B,Q,R) of the Matlab program, the feedback control law $u_1^*$=$-K_1X_1$, and $u_2^*$=$-K_2X_2$ can be calculated, which enables the performance indexes to become very low.

$K_1$=[−2.2361 −137.7072 35.3820 −23.769 −14.9711 −8.83261]

$K_2$=[2.2361 22.3755]

Figure 16:
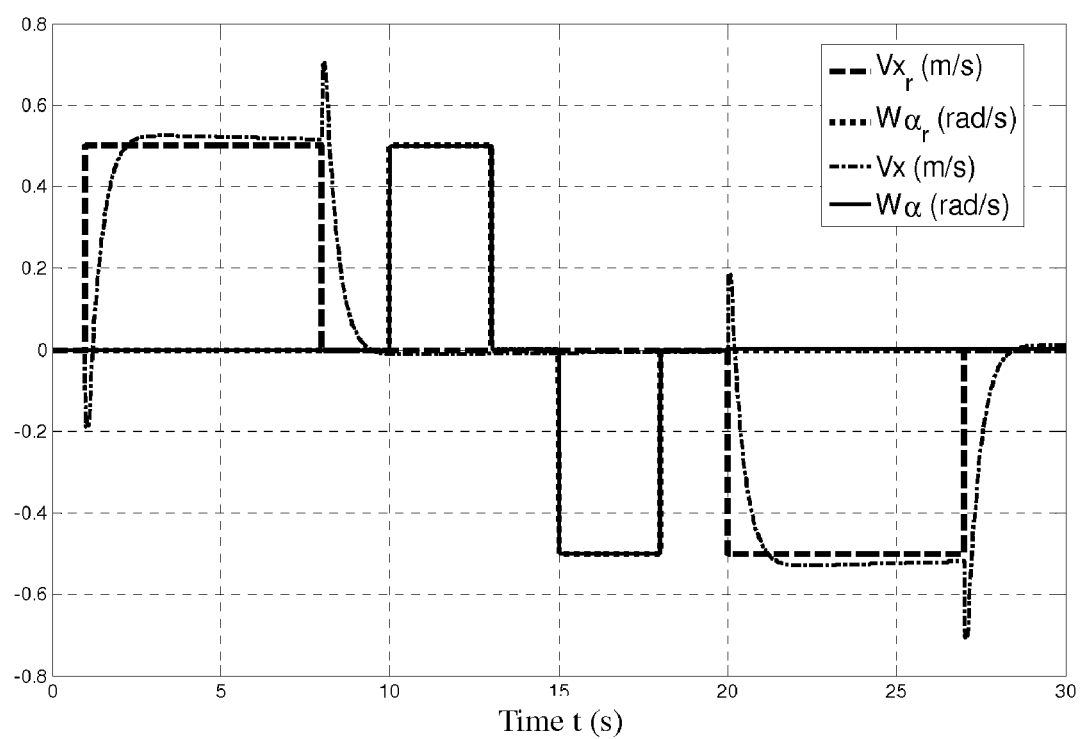
FIG. 16 shows the speed control simulation curve of the flexible two-wheeled self-balancing robot.
Figure 17:
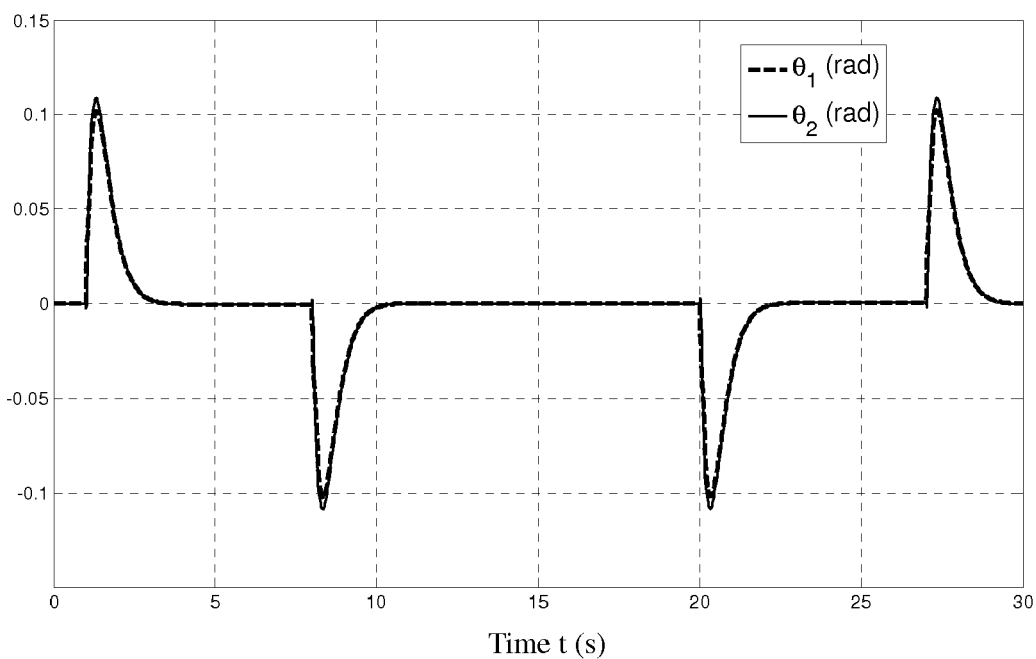
FIG. 17 shows the attitude angle change simulation curve in the speed control of the flexible two-wheeled self-balancing robot.

The robot traces the curve of the linear, rotating speed signal of the pulse width as shown in FIG. 16. The curve in FIG. 17 shows the change of part of obliquity of the chassis and truck for the robot during speed adjustment.

3. Software in the Auxiliary Controller 3

Figure 20:
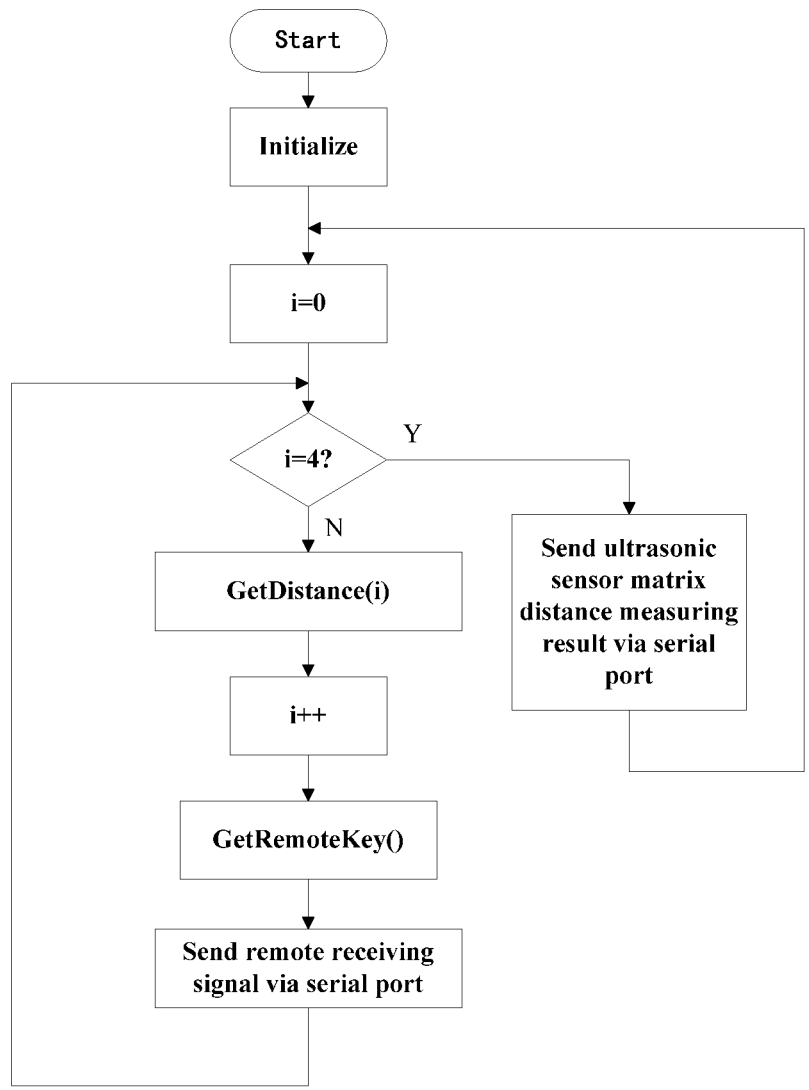
FIG. 20 shows the flow chart of the main program of the auxiliary controller.

The software of the auxiliary controller 3 is edited in the μ'nSP™ integrated development environment of Sunplus Company, and then solidified into the storage via the serial port downloading. The functions of the software is to control the distance measurement of the ultrasonic sensors 17, test the remote control input commands and send the results to the main controller 1. The working flow is as shown in FIG. 20: perform necessary initializing when starting the program, for example, complete the initialization of various variables in the program, set the serial port, IO terminal and parameters of the Timer A; and then begin unlimited circulation, use the GetDistance function circularly according to the numbering sequence of the ultrasonic sensors in each cycle, control the ultrasonic sensors, measure and save the distance with the obstacle in front, after finishing the measurement of the four sensors, issue all measuring results to the organization and EPC via serial port according to communication protocol. During the intermission between the running of the two ultrasonic sensors, use the GetRemoteKey function to read the information of the remote receiver, update the command codes of the remote controller according to return result, and send them to the organizational EPC via serial port according to communication protocol.

Figure 18:
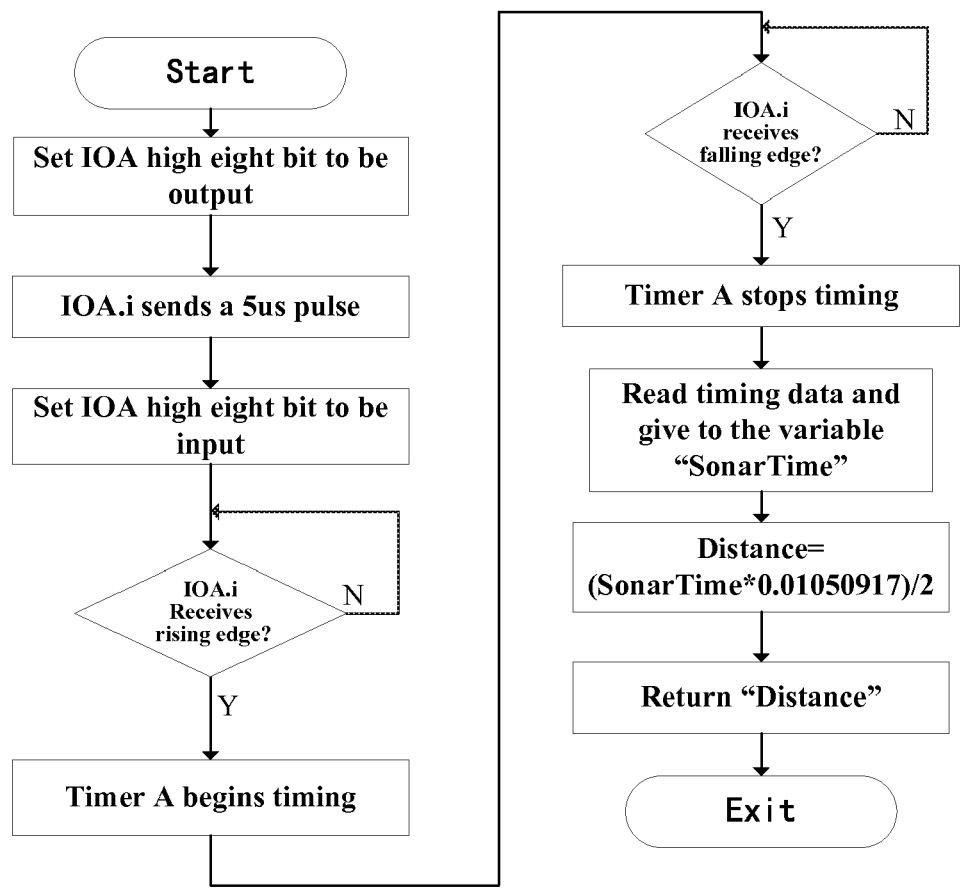
FIG. 18 shows the flow chart of the ultrasonic distance measurement control function of the auxiliary controller.

As shown in FIG. 18, the flow of the GetRemoteKey function is: set IOA low eight bit to input, store the IOA low eight bit value to Key_temp variable, delay for 10 ms, compare the IOA low eight bit input value with the Key_temp, if identical, the remote control key is activated, return to the Key_temp value, but if different, the remote control key is not activated, return to Null.

Figure 19:
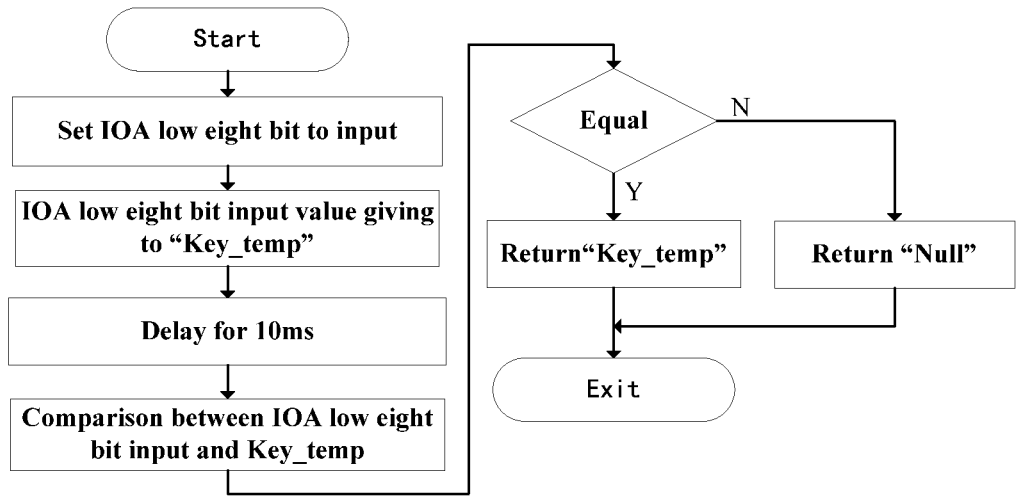
FIG. 19 shows the flow chart of the remote control commands of the auxiliary controller detecting the control function.

As shown in FIG. 19, the flow of the GetDistance function is: set IOA high eight bit to output, send a 5 us pulse to the IO pin IOA.i corresponding to ultrasonic sensors of number I; set IOA high eight bit to input, wait for the arrival of the rising edge of IOA.i, open the Timer A; when the IOA.i falling edge arrives, stop timing, read timing data giving variable Sonar-Time, and then calculate the distance measurement result according to the formula Distance=(Sonar-Time*0.01050917)/2 and then return.

4. Software of the Servo Drivers 4

The software COPLEY MOTION2 of PC end fit for the AJC55-18 can automatically calculate the proportional integral (PI) adjusting parameters of servo program by inputting the parameters of the DC motors (5), automatically generate servo control program after simply setting of the structure of the control system, and download, solidify to the storage unit of the AJC55-18 via serial port. In this servo program control cycle 1 ms, by realizing motor reference torque and reference turning by means of the PWM signal and turning signal of the DSP output, take the armature current as negative feedback to realize PI servo control of motor torque.

III. Utilization of the Robot System

Perform the following steps when using the robot of this embodiment:

1 Confirm the wiring connection of the electric system of the robot, and connect the mouse 32 for the robot.

2. Turn the boat-like switch 60 of the main power to "ON" position.

3. Press contact switch 58 to start the EC5-1717CLDNA of the main controller 1.

4. Run RobotControl.exe.

5. Disconnect the mouse 32 and hold the robot to upright location firmly.

6. Turn on the motor switch 59 and then the robot begins balance control.

7. After the robot is stable in upright location, let it go.

8. Select robot running mode or action commands to operate the robot through buttons on the remote controller 33.

9. When shutdown, stop the robot by the remote controller 33, hold the robot to stand stably, and then turn off motor switch 59, RobotControl.exe, EC5-1717CLDNA, boat-like switch 60 of the main power in sequence.

What is claimed is:

1. A flexible two-wheeled self-balancing robot system, comprising an electric system and mechanical body; wherein the electric system includes a main controller, a motion controller, an auxiliary controller, two motor servo drivers, sensors, input/output devices, two DC motors and a power supply system; the mechanical body includes a truck, an elastic joint, a chassis, a protective frame and two wheels; characterized in that:

the truck is a split-level frame, at least one camera is installed on the top board, the space between the top board and bottom plate is isolated into several layers by baffle plates, a tilt-meter, a gyro and ultrasonic sensors are installed in the truck;

the bottom plate of the truck and the chassis are connected by the elastic joint;

the chassis is a box structure, the tilt-meter, gyro are installed in the chassis, and two DC motors installed inside are respectively fixed on inner walls of both sides of the chassis, one end of each motor's shaft is connected with the shaft of corresponding wheel, the other end of each motor's shaft is connected with corresponding encoder; a removable protective frame and a truckle are installed at the bottom of the chassis; the two wheels are coaxial;

the top and bottom of the elastic joint are an upper supporting disc and a lower supporting disc, its section is in convex shape and holes in the centers of the discs are used to pass through cables; the upper and lower supporting discs are linked together by two link portions and a rotating shaft, wherein a two-arm torsion spring, having an upper arm and a lower arm, is fixed on respective protruding portions of the rotating shaft, the upper arm of the torsion spring is fixed on the upper supporting disc, the lower arm of the torsion spring is fixed on the lower supporting disc; a cylindrical spring, a section of the cylindrical spring is firmly held down and fixed between the upper supporting disc and the lower supporting disc, and both ends are sleeved on respective portions of the upper, lower supporting discs which are located outside of the respective link portions of the upper and lower supporting discs;

the main controller is an embedded computer system;
the motion controller comprises a DSP system;
the auxiliary controller comprises a MCU or DSP embedded system;
the sensors include: two tilt-meters detecting the change of pitching inclination angle of the truck and chassis for the robot, two gyros detecting the change of inclination angle speed, two encoders detecting the change of rotating angle of motors, a camera detecting an image information, and ultrasonic sensors detecting the obstacle distance;
the connection relation of the electric system is: the main controller is connected with the motion controller, the auxiliary controller and the input/output devices; the motion controller is connected with the tilt-meters, the gyros, the encoders and the servo drivers; the auxiliary controller is connected with the ultrasonic sensors and remote receiver; the camera is connected with the main controller; the servo controller is connected with the DC motor; the power supply system is connected with various electric devices for power supply.

2. The flexible two-wheeled self-balancing robot system as claimed in claim 1, characterized in that the power supply system comprises: a rechargeable battery, a power relay board for voltage conversion and a power monitor board for monitoring battery voltage.

3. The flexible two-wheeled self-balancing robot system as claimed in claim 1, characterized in that the DC motors comprise DC torque motors, DC motors with reducers or DC brushless motors.

4. The flexible two-wheeled self-balancing robot system as claimed in claim 1, characterized in that the input/output devices comprise: a keyboard, a mouse, a remote controller, a LCD, a monitor, a microphone and speakers.

* * * * *